(12) United States Patent
Suzuki et al.

(10) Patent No.: US 6,905,438 B2
(45) Date of Patent: Jun. 14, 2005

(54) VEHICLE POWERTRAIN CONTROL SYSTEM AND METHOD FOR ENHANCED VEHICLE START-UP ACCELERATION

(75) Inventors: Hidetoshi Suzuki, Kanagawa (JP); Kouichi Shimizu, Kanagawa (JP); Tatsuya Kamata, Kanagawa (JP); Keiji Kadota, Kanagawa (JP); Keigo Nishio, Kanagawa (JP); Kimitaka Nakamura, Tochigi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/383,238

(22) Filed: Mar. 7, 2003

(65) Prior Publication Data

US 2003/0216215 A1 Nov. 20, 2003

(30) Foreign Application Priority Data

| Mar. 8, 2002 | (JP) | 2002-063733 |
| Apr. 8, 2002 | (JP) | 2002-105621 |
| Jul. 15, 2002 | (JP) | 2002-205997 |
| Sep. 4, 2002 | (JP) | 2002-259180 |

(51) Int. Cl.⁷ .......................... B60K 41/02; H02P 15/00; G05B 11/01
(52) U.S. Cl. ................. 477/5; 477/8; 318/630
(58) Field of Search ............... 477/7–8, 3, 5; 180/65.1, 65.5, 65.2, 65.4, 65.6; 318/630, 432; 475/5

(56) References Cited

U.S. PATENT DOCUMENTS

| 5,346,031 A | * | 9/1994 | Gardner ..................... 180/179 |
| 5,464,084 A | | 11/1995 | Aoki et al. |
| 5,558,173 A | | 9/1996 | Sherman |
| 5,788,005 A | | 8/1998 | Arai |
| 5,821,720 A | * | 10/1998 | Deng et al. .................. 318/630 |
| 5,839,535 A | | 11/1998 | Arai |
| 6,008,606 A | | 12/1999 | Arai et al. |
| 6,434,469 B1 | | 8/2002 | Shimizu et al. |
| 6,569,059 B1 | * | 5/2003 | Ito ............................. 477/110 |
| 6,575,870 B2 | * | 6/2003 | Kitano et al. .................. 477/3 |
| 6,736,753 B2 | * | 5/2004 | Endo et al. .................... 477/3 |
| 2002/0023791 A1 | * | 2/2002 | Kima et al. ................. 180/65.5 |

FOREIGN PATENT DOCUMENTS

| JP | 5-131858 A | | 5/1993 | |
| JP | 405319144 A | * | 12/1993 | .................... 477/8 |
| JP | 7-172196 A | | 7/1995 | |
| JP | 8-300964 A | | 11/1996 | |
| JP | 8-300965 A | | 11/1996 | |
| JP | 11-125129 A | | 5/1999 | |
| JP | 11-243608 A | | 9/1999 | |
| JP | 3062721 B2 | | 5/2000 | |
| JP | 3261673 B2 | | 12/2001 | |

OTHER PUBLICATIONS

Nissan March, Service Manual, Feb. 2002, pp. C6–C22, Nissan Motor Co., Limited.
Nissan March, Service Manual, Sep. 2002, pp. C6–C13, Nissan Motor Co., Limited.

* cited by examiner

*Primary Examiner*—Roger Pang
(74) *Attorney, Agent, or Firm*—Foley & Lardner LLP

(57) ABSTRACT

A vehicle powertrain includes an electric motor (4) and a clutch (12) between the electric motor and a motor driven road wheel (3L, 3R). Powertrain play between the electric motor (4) and the road wheel is eliminated upon determination that powertrain play elimination (PPE) is needed for motor torque transmission to the motor driven road wheel. The PPE includes controlling engagement of the clutch and regulating the electric motor to produce a very small amount of motor torque required for PPE.

27 Claims, 32 Drawing Sheets

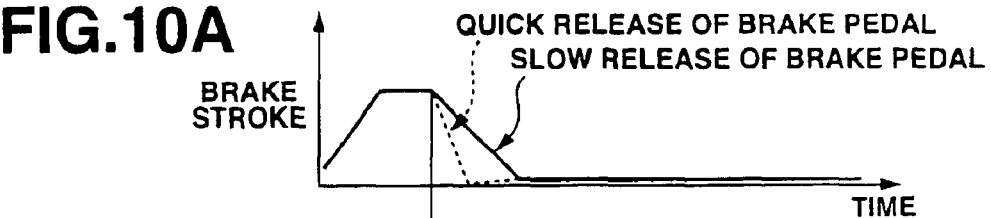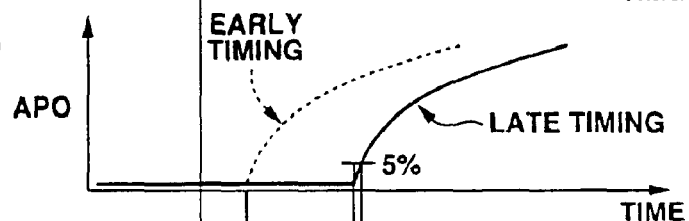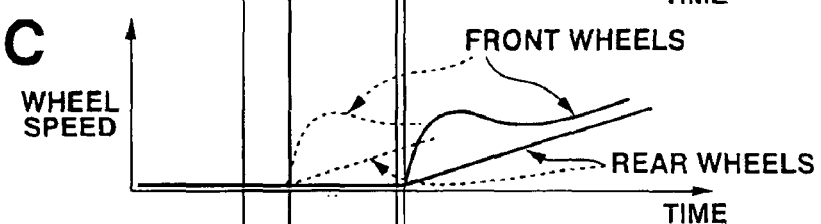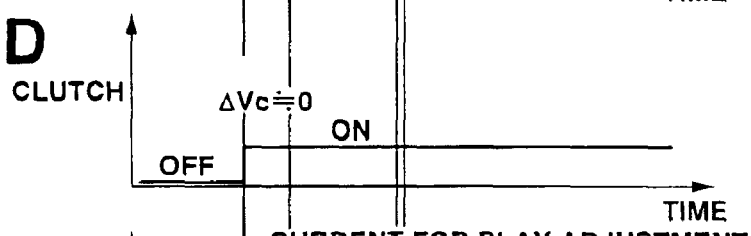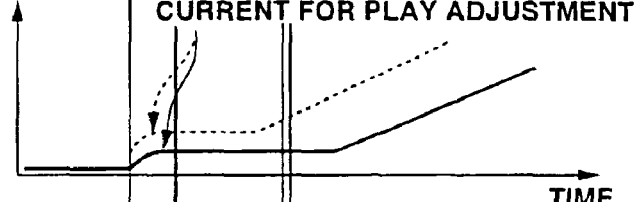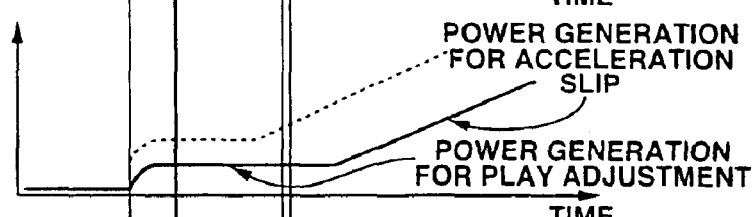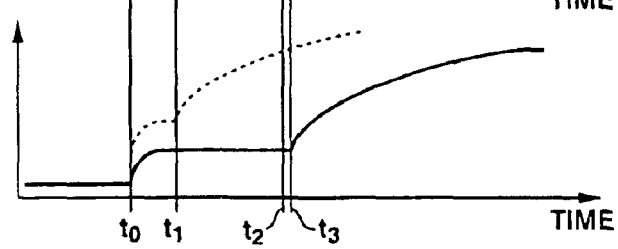

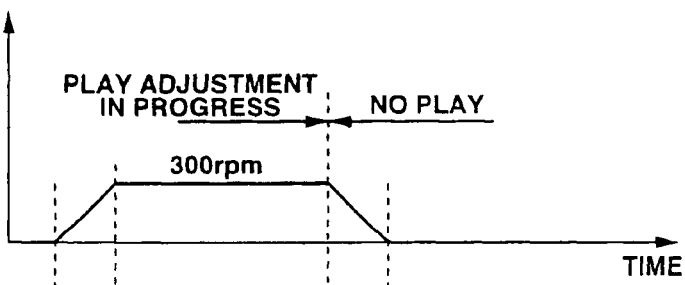
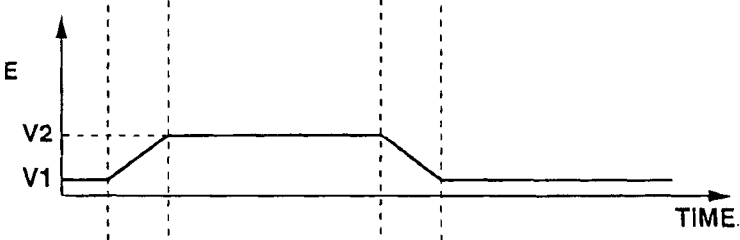
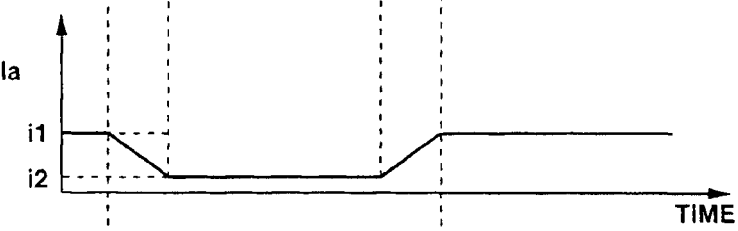
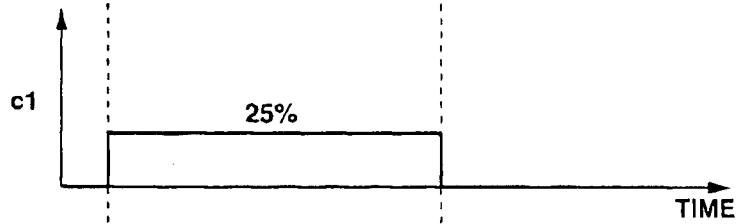
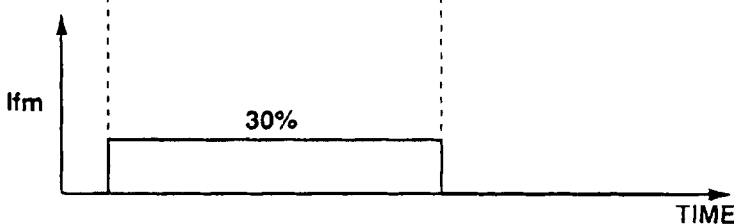

FIG.22
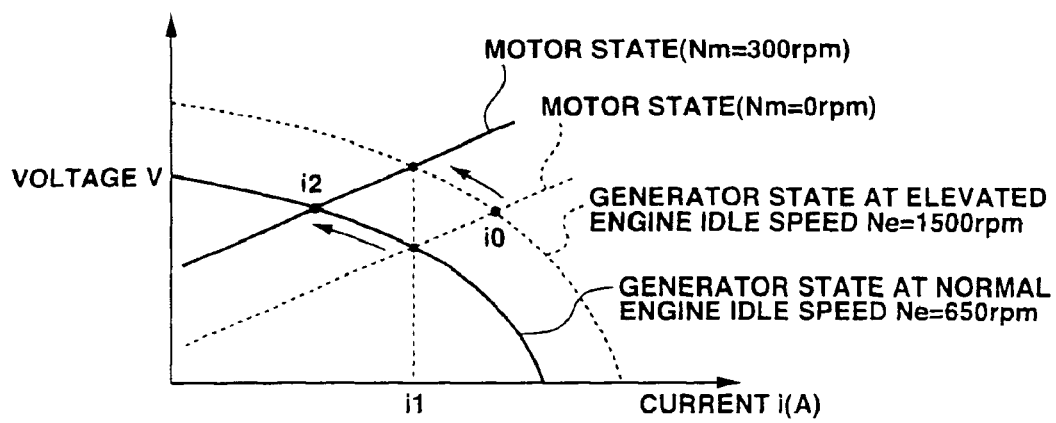
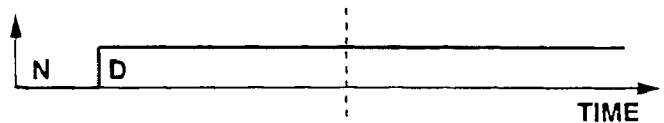
FIG.23A SHIFT
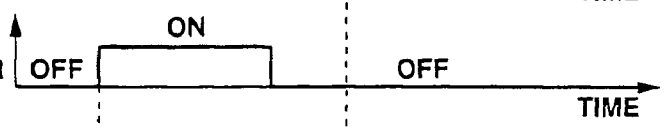
FIG.23B PLAY ADJUSTOR
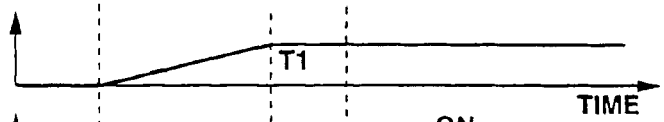
FIG.23C TIMER T
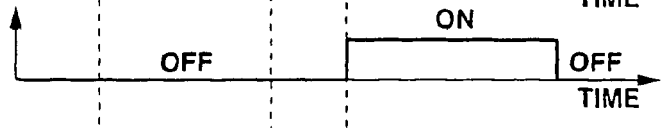
FIG.23D ACC. PEDAL
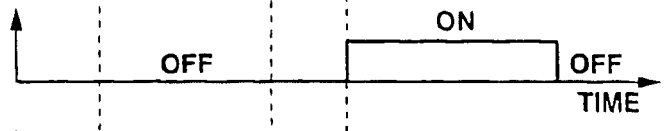
FIG.23E 4WD
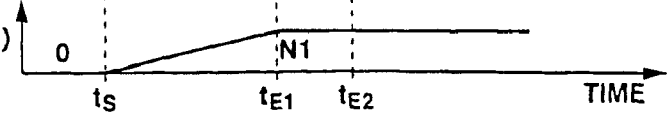
FIG.23F Nm(rpm)

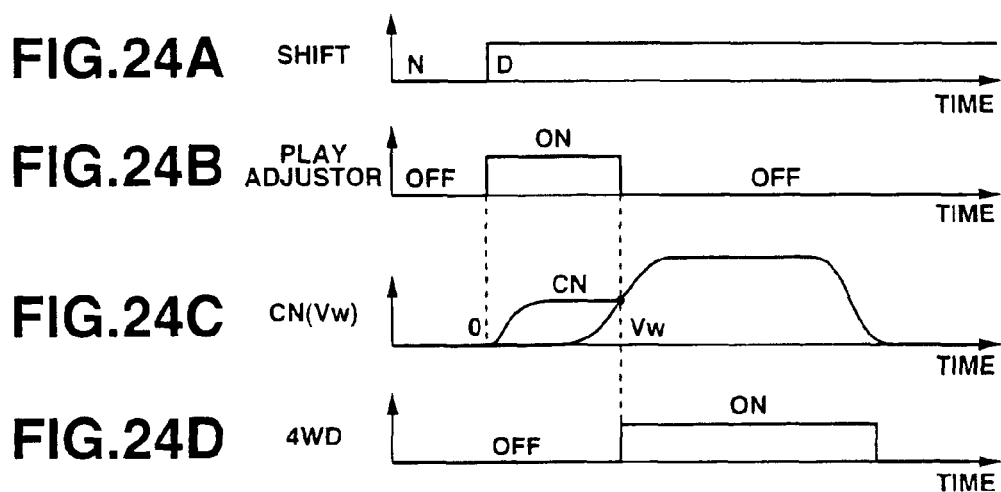

SHIFT

PLAY ADJUSTOR

ACC.

4WD $V_w$

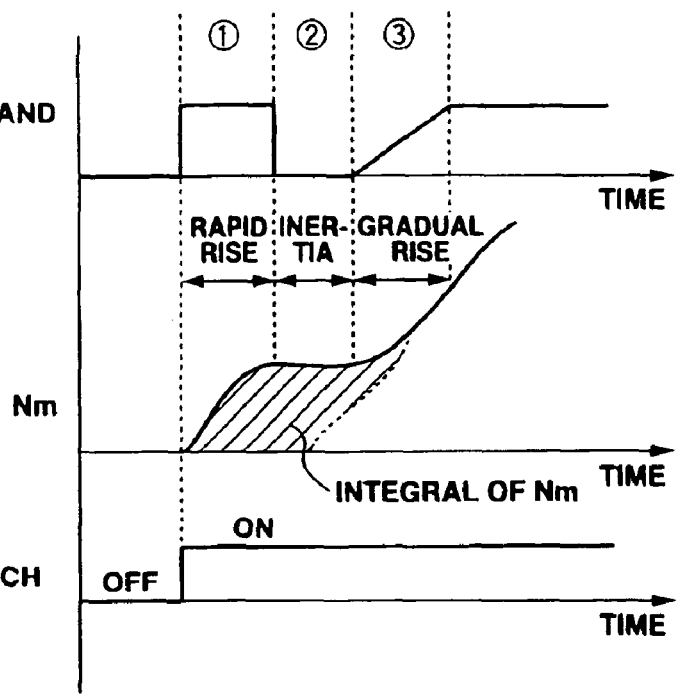
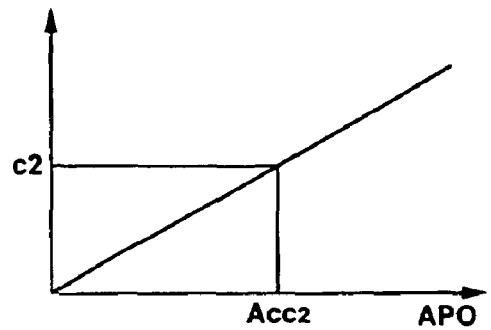
FIG.34

FIG.35
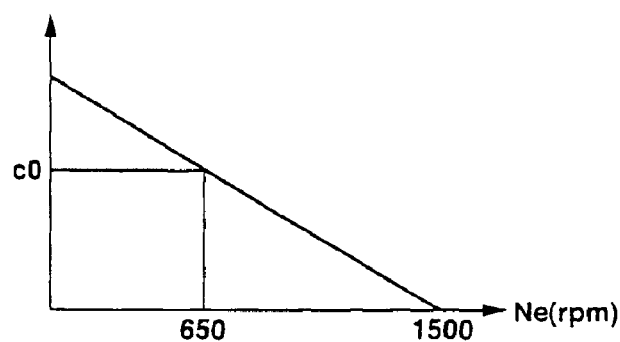
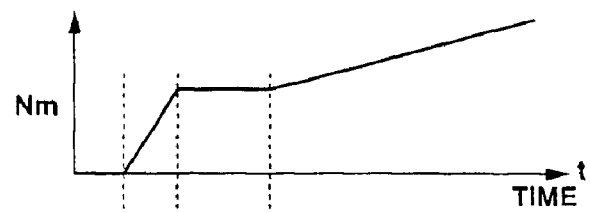
FIG.36A
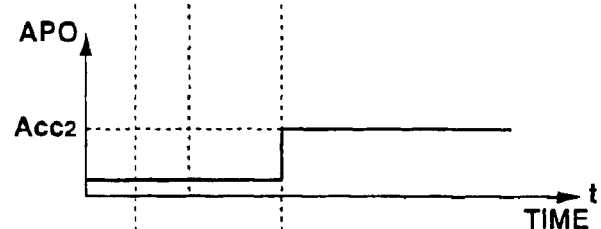
FIG.36B
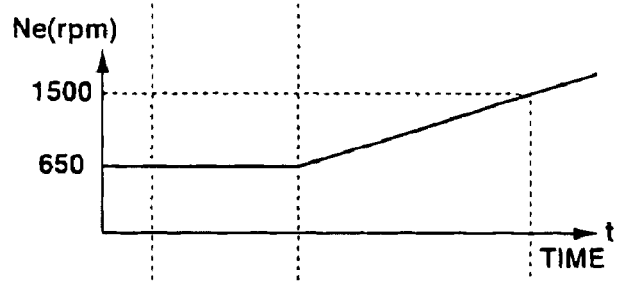
FIG.36C
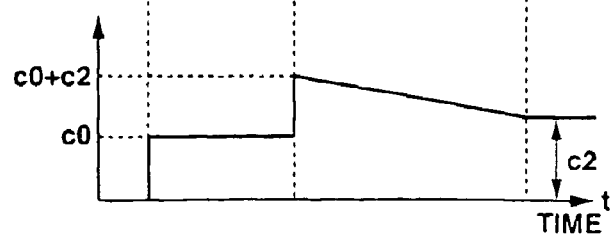
FIG.36D

FIG.39A ACC.
FIG.39B SHIFT
FIG.39C PLAY ADJUSTOR
FIG.39D Tm
FIG.39E Nm

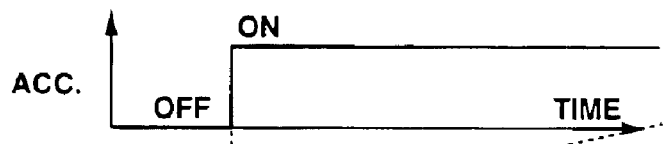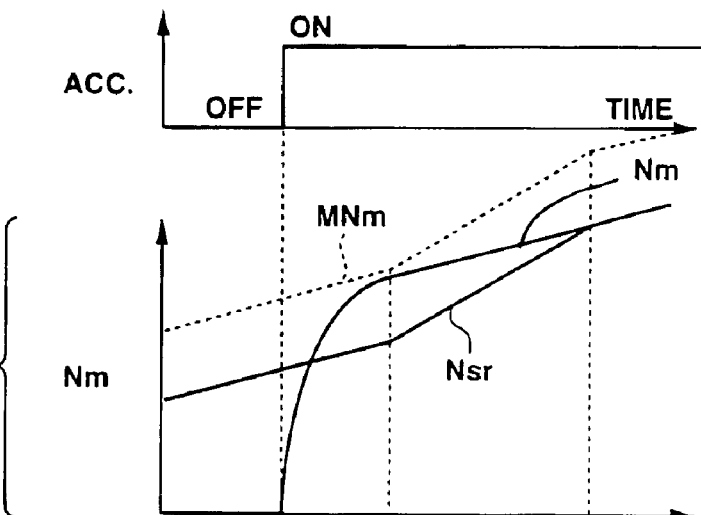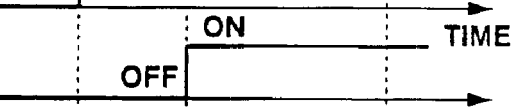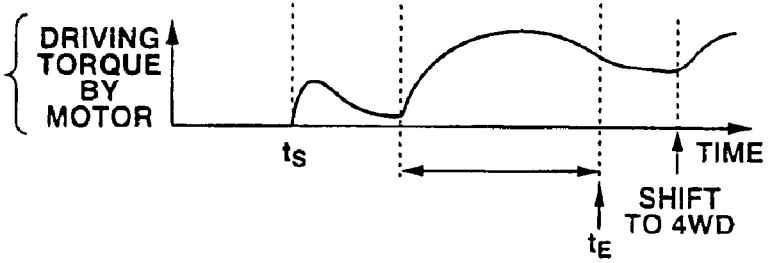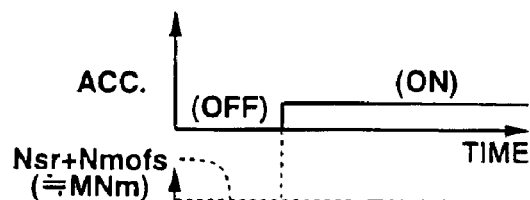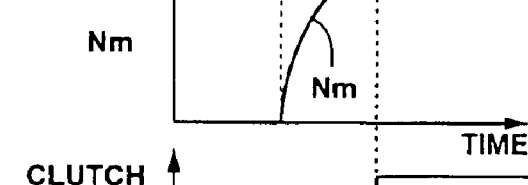

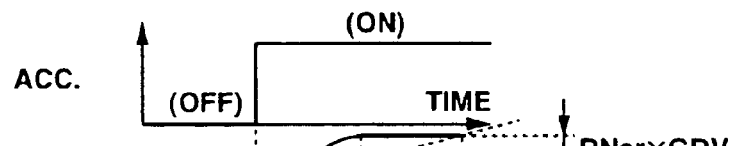
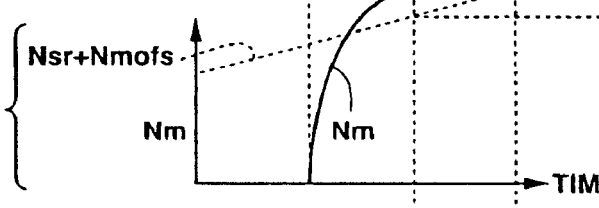
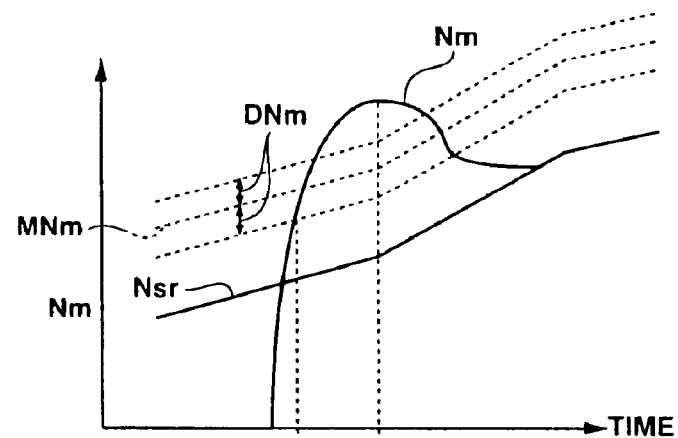
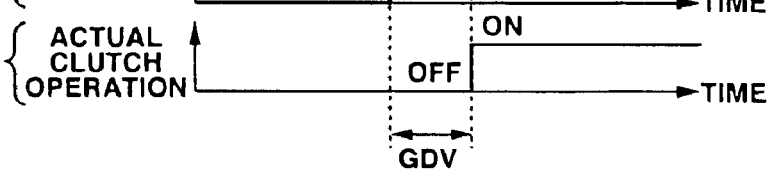

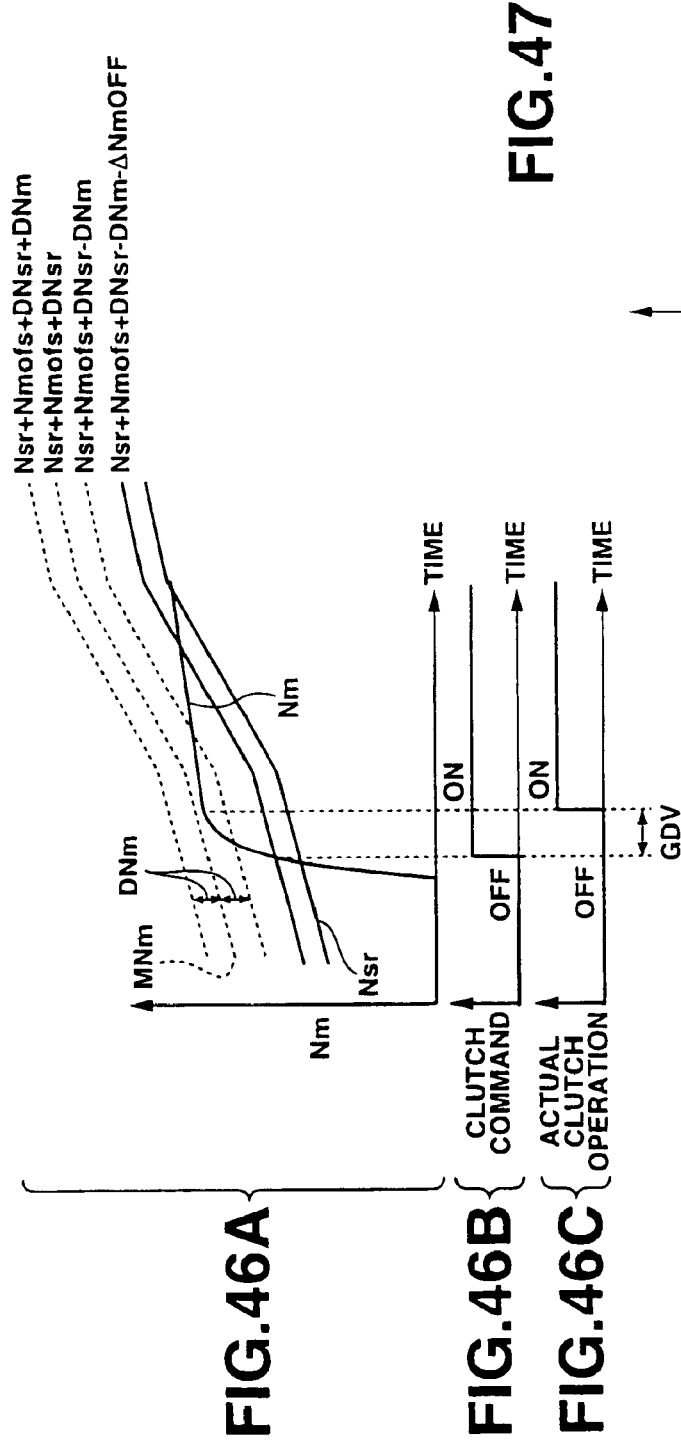
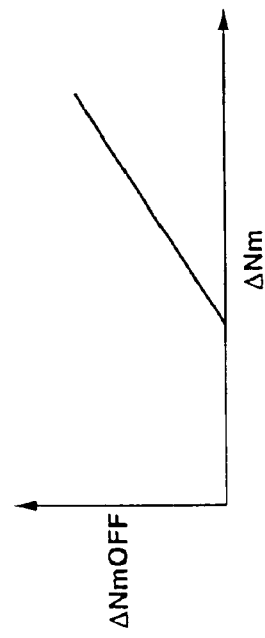

VEHICLE POWERTRAIN CONTROL SYSTEM AND METHOD FOR ENHANCED VEHICLE START-UP ACCELERATION

BACKGROUND OF THE INVENTION

1. Field of the Invention

The present invention relates to vehicle powertrain control system and method.

2. Description of the Background Art

Motor vehicles are proposed, which have one powertrain including an engine, and another powertrain including an electric motor and a clutch. One powertrain is coupled with one set of road wheels. Another powertrain is coupled with another set of road wheels. Various examples of a motor vehicle of the above kind are known from JP-B2 P3062721, JP-B2 P3261673 (=U.S. Pat. No. 6,008,606) and JP-A 11-243608, respectively.

A motor vehicle disclosed in JP-B2 P3062721 includes an electric traction motor and a reduction gearing. The reduction gearing is connected to a clutch to engage and disengage the motor to and from the associated road wheels. The motor is excited only for assisting start-up of the motor vehicle. The excitation of the motor ends when the load on the motor drops after a temporary rise. The clutch disengages the motor from the road wheels after the motor vehicle has started.

A motor vehicle disclosed in JP-B2 P3261673 (=U.S. Pat. No. 6,008,606) includes an electric motor and a reduction gearing. The reduction gearing is connected to a dog clutch to engage and disengage the motor to and from the associated road wheels. The motor is excited only for assisting start-up of the motor vehicle. The excitation of the motor ends when the load on the motor drops after a temporary rise. The clutch disengages the motor from the road wheels after the motor vehicle has started.

A motor vehicle disclosed in JP-A 11-243608 includes an electric motor and a reduction gearing. The reduction gearing is connected to a clutch to engage and disengage the motor to and from the associated road wheels. To avoid shocks, according to one strategy, the motor is regulated to raise output torque gradually after engagement of the clutch. According to another strategy, the motor is regulated to increase speed to bring a revolution speed of an input shaft of the clutch into agreement with a revolution speed of an output shaft of the clutch before engagement of the clutch.

The known systems are satisfactory to some extent in enhancing vehicle start-up and/or acceleration performance by reducing shocks upon engagement of a clutch. However, a need remains for an electric motor and clutch control, which provides shock less quick response to further enhance vehicle start-up and/or acceleration performance. It appears that the known systems are not satisfactory in this respect.

An object of the present invention Is to provide vehicle powertrain system and method for enhanced start-up acceleration performance.

SUMMARY OF THE INVENTION

In one exemplary implementation of the present invention, there is provided a vehicle powertrain control system, comprising:

a powertrain including an electric motor and a clutch between the electric motor and a motor driven road wheel; and a powertrain play adjustor component for eliminating powertrain play between the electric motor and the road wheel upon determination that powertrain play elimination (PPE) is needed for motor torque transmission to the motor driven road wheel the powertrain play adjustor component controlling engagement of the clutch and regulating the electric motor to produce a very small amount of motor torque required for PPE.

BRIEF DESCRIPTION OF THE DRAWINGS

The invention will be apparent from reading of the following description in conjunction with the accompanying drawings

FIGS. 10A to 10G are timing charts illustrating operation of the present invention.

FIGS. 21A to 21E are timing charts illustrating the motor control by keeping electric power constant, FIG. 22 is a graphical illustration of motor control by keeping electric power constant.

FIGS. 23A to 23F are timing charts illustrating another example of end-condition for PPE.

FIGS. 24A to 24D are timing charts illustrating another example of end-condition for PPE.

FIGS. 33A to 33C are timing charts for the flow diagram in FIG. 32.

FIG. 34 is a graph illustrating one example of varying of a correction factor (c2) of generator command (c1) with different degrees (%) of acceleration demand (APO).

FIG. 35 is a graph illustrating one example of varying of a base factor (c0) of generator command (c1) with different values of engine speed (Ne).

FIGS. 36A to 36D are timing charts illustrating varying of generator command (c1) in the case where the correction factor (c2) and the base factor (c0) vary as illustrated in FIGS. 34 and 35.

FIGS. 42A to 42D are timing charts for the flow diagram in FIG. 41.

FIGS. 43A to 43C are timing charts illustrating a case where a mechanical delay between a command for clutch engagement and an actual occurrence of the clutch engagement does not pose any problem.

FIGS. 44A to 44D are timing charts illustrating a case where the mechanical delay in clutch (GDV) poses problem that great shock occurs.

FIGS. 45A to 45C are timing charts illustrating a case where the mechanical delay in clutch (GDV) poses problem that an undesired overshoot occurs, FIGS. 46A to 46C are timing charts illustrating operation according to the present invention, which effectively suppresses the occurrence of overshoot.

FIG. 47 is a graph illustrating varying of $\Delta NmOFF$ with different values of $\Delta Nm$.

DETAILED DESCRIPTION OF THE INVENTION

Figure 1:
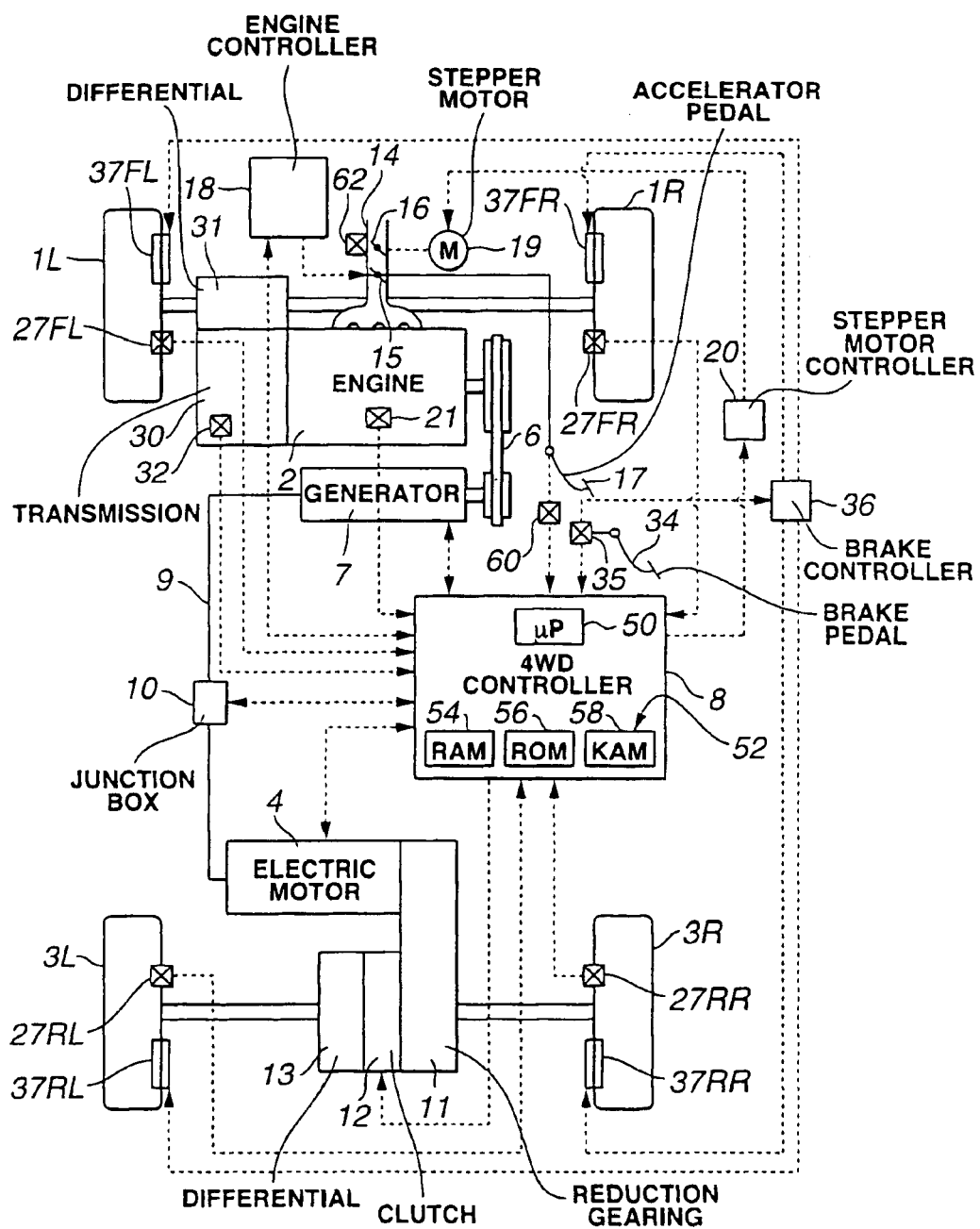
FIG. 1 is a simplified view of a motor vehicle incorporating the present invention.

Referring now to the accompanying drawings, FIG. 1 shows a motor vehicle incorporating a vehicle powertrain control system according to the present invention. The vehicle includes one or first powertrain and another or second powertrain. The first powertrain includes a prime mover in the form of an internal combustion engine 2. The first powertrain is drivingly coupled with a first set of road wheels 1L and 1R. The second powertrain includes an electric traction motor 4 as a source of driving torque, and a clutch 12 as a torque-transmitting device between the electric motor 4 and a second set of road wheels 3L and 3R.

In the illustrated motor vehicle, the engine 2 is a main source of driving torque. The engine 2 has an induction pipe in the form of an intake manifold 14. Within the intake manifold 14, the engine 2 has a main throttle valve 15 and a sub throttle valve 16.

The main throttle valve 15 opens in degrees In response to an acceleration demand in the form of an accelerator pedal opening (APO) of an accelerator 17 in the form of an accelerator pedal in the illustrated motor vehicle. In the illustrated motor vehicle, the APO may be expressed as a proportion (%) of an angle through which the vehicle operator manipulates the accelerator 17 from its released position to the fully manipulated angle. An operative connection between the accelerator 17 and the main throttle valve 15 may be a mechanical linkage as indicated by the fully drawn line or an actuator system. The actuator system includes an accelerator sensor 60, an engine controller 18 and a throttle actuator, not shown. The engine controller 18 monitors the accelerator sensor 60 to receive the APO of the accelerator 17, determines a desired value of opening angle of the main throttle 15, and computes an actuator command. In response to the actuator command, the throttle actuator adjusts the main throttle valve 15 to the desired value, For actuation of the sub throttle valve 16, a stepper motor 19 and a throttle sensor 62 are provided. A stepper motor controller 20 receives a control signal indicative of an angle $\Delta\theta$. The manner of determining this angle $\Delta\theta$ is explained later in connection with the flow diagram in FIG. 9. The stepper motor controller 20 computes the number of steps by which the stepper motor 19 moves. The stepper motor controller 20 receives the output of the throttle sensor 62 to form a closed loop control of the sub throttle valve 16. Using the sub throttle valve 16, an engine output torque Te is altered independently of the position of the main throttle valve 15.

For transmitting the engine torque Te, the first powertrain further includes a transmission 30 and a differential 31. The transmission 30 has various shift ranges. To detect selected shift range, the transmission 30 is provided with a shift detector 32. In the illustrated embodiment, the transmission 30 is an automatic transmission including a torque converter. The torque converter includes a pump impeller, a stator and a turbine runner. The pump impeller is coupled with a crankshaft of the engine 2 for rotation therewith. The turbine runner is coupled with an input shaft of the automatic transmission. An output shaft of the automatic transmission is coupled with the differential. The automatic transmission has various speed ratios of the input shaft to the output shaft. The differential 31 is disposed between the first set of road wheels 1L and 1R. In the illustrated embodiment, an automatic transaxle of the RE4F03B type is used, which includes a torque converter, a four-speed automatic transmission and a differential. For further information on the automatic transaxle of the RE4F03B type, reference is made to pages C-6 to C-22 in service manual "Nissan MARCH" issued February 2002 by Nissan Motor Co., Limited.

The second powertrain includes a reduction gearing 11 coupled with the electric motor 4, and a differential 13 coupled with the clutch 12. The differential 13 is disposed between the second set of road wheels 3L and 3R. The clutch 12 has an input shaft coupled with an output member of the reduction gearing 11. An output shaft of the clutch 12 is coupled with an input member of the differential 13. In the illustrated embodiment, an integral drive unit including a reduction gearing, an electromagnetic clutch and a differential is used. For further information on this integral drive unit, one may make reference to pages C-6 to C-13 (particularly page C-10) in service manual "Nissan MARCH" issued September 2002 by Nissan Motor Co., Limited.

In the illustrated embodiment, the clutch 12 is an electromagnetic clutch equipped with a cam-actuated pilot clutch. For excitation of coils, the clutch 12 is connected to a source of electricity, not shown. The description on how the cam-actuated pilot clutch operates is found in U.S. Pat. No. 5,464,084 issued Nov. 7, 1995, which has been incorporated herein by reference in its entirety.

In the illustrated embodiment, the road wheels of the first set are a front left road wheel 1L and a front right road wheel 1R, respectively, and the road wheels of the second set are a rear left road wheel 3L and a rear right road wheel 3R, respectively. The present invention is not limited to this example. The road wheels of the first set may be a rear left road wheel and a rear right road wheel, respectively, and the road wheels of the second set may be a front left road wheel and a front right road wheel. As the discussion proceeds, it will be understood that the vehicle is ready for operation in 4WD mode when, after engagement of clutch 12, powertrain play is eliminated for motor torque transmission to motor driven or the second set of road wheels 3L and 3R.

With regard to the second powertrain, the electric motor 4 operates on electric power. A source of electric power may be a battery. However, in the illustrated implementation of the present invention, the source is a generator 7 drivingly connected to the engine 2. An endless belt 6 and pulleys drivingly interconnect the generator 7 and the engine 2, causing the generator 7 to rotate at a revolution speed Nh that is expressed as the product of the engine speed Ne and a pulley ratio $R_p$. The pulley ratio $R_p$ is a ratio between the pulleys, one on the engine output shaft, and the other on the generator shaft.

The generator 7 becomes a load to the engine 2 when it is supplied with generator field current Ifh and produce electric power in response to an engine torque that overcomes this load. This engine torque is hereinafter called "load torque Th." A cable 9 interconnects the generator 7 and the electric motor 4. A junction box 10 is positioned in the cable 9 between the generator 7 and the electric motor 4. Within the junction box 10, a relay 24 is provided to selectively supply the electric power to the electric motor 4.

With continuing reference to FIG. 1, the motor vehicle is provided with a decelerator in the form of a brake pedal 34. A brake stroke sensor 35 detects a brake or deceleration demand in the form of an operator stroke input applied to the brake pedal 34. The detected stroke by the brake stroke sensor 35 is fed to a brake controller 36.

The brake controller 36 adjusts braking torque applied to the road wheels 1L, 1R, 3L and 3R by application of wheel brakes 37FL, 37FR, 37RL and 37RR.

Wheel speed sensors 27FL, 27FR, 27RL and 27RR detect wheel revolutions of the associated road wheels, respectively. An engine revolution sensor 21 detects a parameter indicative of revolution of the engine 2.

Figure 2:
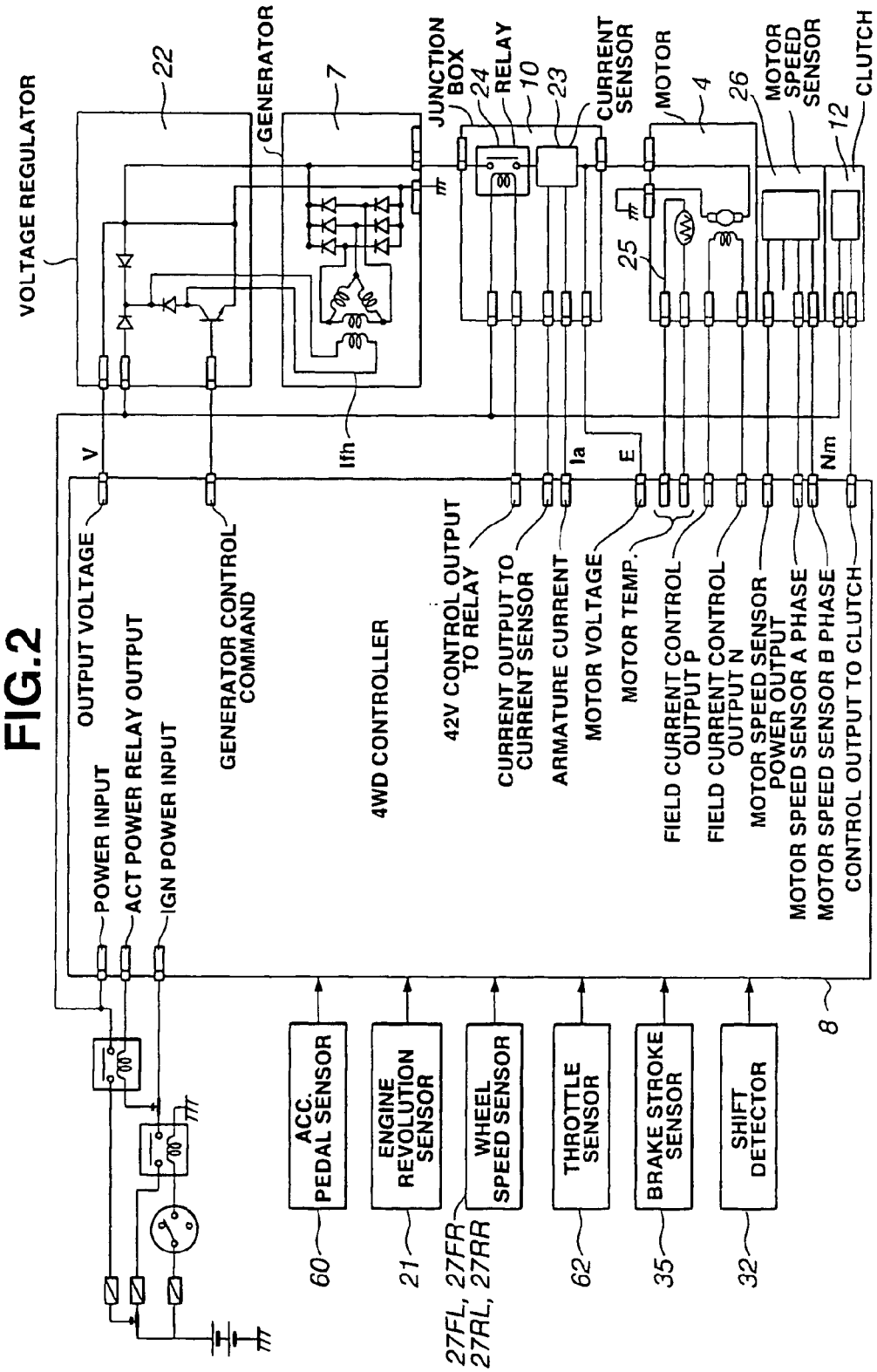
FIG. 2 is a hardware drawing showing the relationship between an all-wheel drive or 4WD controller, an engine controller, and the associated devices.

With reference also to FIG. 2, a current sensor 23 within the junction box 10 measures current of electric power supplied to the electric motor 4 by the generator 7. The measured current is a measure of armature current Ia of the electric motor 4. A motor speed sensor 26 detects revolution Nm of a drive shaft of the electric motor 4. A thermistor 25 is provided to detect temperature of the electric motor 4.

The output signals of the shift detector 32, the sensors 35, 62, 27FL, 27FR, 27RL, 27RR, 21, 60, and 26, and the thermistor 25 are used as inputs to a 4WD controller 8. The 4WD controller 8 includes a microprocessor 50 in communication with computer-readable storage medium 52. As will be appreciated by those skilled in the art, the computer-readable storage medium 52, for example, may include a random access memory (RAM) 54, a read-only memory (ROM) 56, and/or a keep-alive memory (KAM) 58.

With reference to FIG. 2, the 4WD controller processes the inputs and generates generator command c1 (duty ratio). The generator command c1 is used as input of a voltage regulator 22 for the generator 7. The voltage regulator 22 adjusts generator field current Ifh to a value indicated by the generator command c1. The voltage regulator 22 detects generator output voltage V. The detected generator output voltage V is fed to the 4WD controller 8. Under the control of the 4WD controller 8, the voltage regulator 22 adjusts generator field current Ifh. Adjusting the field current Ifh adjusts load torque Th and generator output voltage V. Thus, the 4WD controller 8 can control load torque Th and generator output is voltage V.

The 4WD controller 8 generates relay command for the relay 24. In response to the relay command, the relay 24 controls application voltage (or current) to the electric motor 4.

The 4WD controller 8 generates motor command for the electric motor 4, thus adjusting motor field current Ifm. Adjusting the motor field current Ifm can adjust motor torque Tm.

The 4WD controller 8 generates clutch command for the clutch 12. In response to the clutch command, the clutch 12 is engaged or disengaged.

Figure 3:
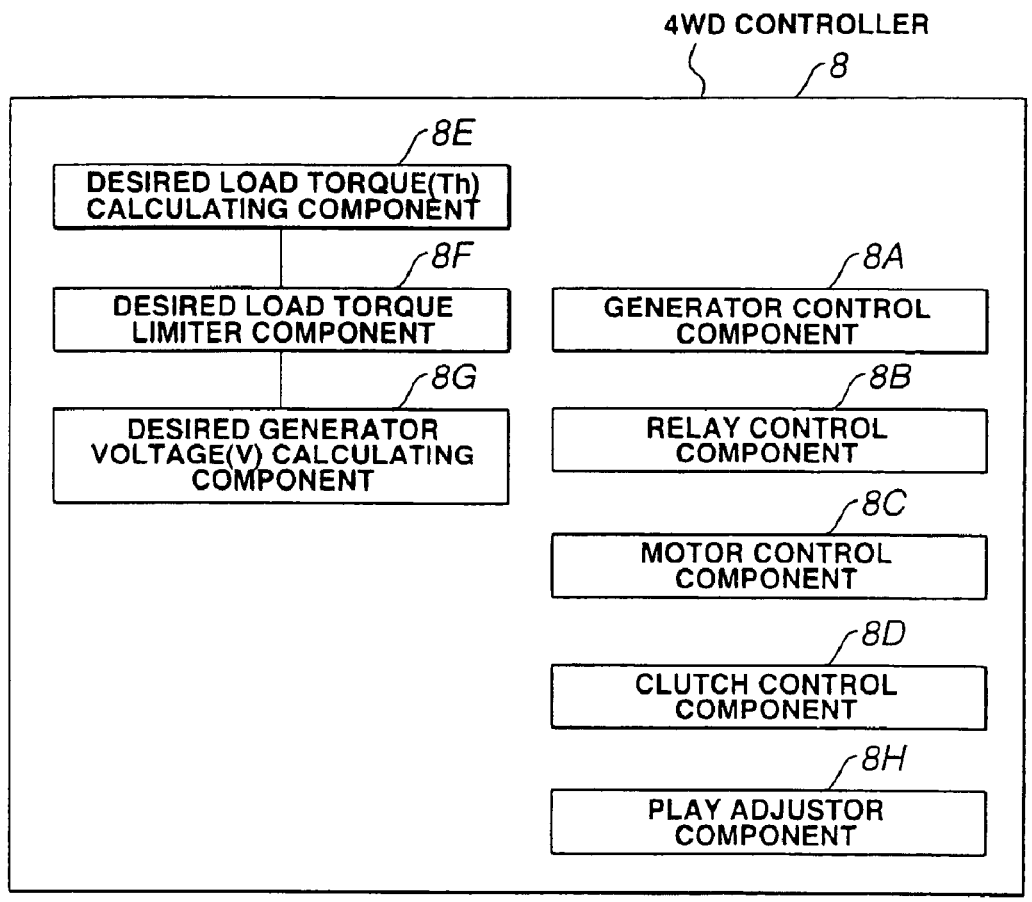
FIG. 3 is a block diagram of the 4WD controller.

The block diagram in FIG. 3 illustrates software or hardware components of the 4WD controller 8.

In one exemplary implementation according to the present invention, a generator control component BA receives a desired value of generator voltage V. The desired value of generator voltage V is calculated at a desired generator voltage (V) calculating component 8G. The generator control component 8A determines generator command c1 in the form of duty ratio (%). This generator command c1 is applied to the voltage regulator 22. In response to the generator command c1, the voltage regulator 22 adjusts generator field current Ifh, causing the generator 7 to output voltage V as high as the desired value. In this implementation, a powertrain play adjustor component 8H determines a desired value of voltage for eliminating a powertrain play GaV and a desired value of load torque GaTh as a function of GaV. The powertrain play adjustor component 8H outputs the desired value of voltage GaV to the desired voltage (V) calculating component 8G, and it outputs the desired value of load torque GaTh to the engine controller 18.

In another exemplary implementation according to the present invention, a powertrain play adjustor component 8H determines generator command c1 needed for eliminating a powertrain play. The generator command c1 is applied to the generator control component 8A. In this case, a desired generator voltage (V) calculating component 8G* does not calculate a desired value of generator voltage V when the powertrain play is being eliminated although it does when the powertrain play is not being eliminated.

A relay control component 8B generates relay command. The relay command is applied to the relay 24 within the junction box 10.

A motor control component 8C inputs information on motor revolution speed Nm, on motor (induction) voltage E, and on motor armature current (motor current) Ia. Motor armature current Ia is determined as a function of motor torque Tm and motor field current Ifm. Thus, motor armature current Ia determines motor torque Tm if motor field current Ifm is unaltered. The motor control component 8C adjusts motor field current Ifm.

A clutch control component 8D receives clutch engagement/release command from the powertrain play adjustor component 8H. In response to the clutch command, the state of the clutch 12 is controlled by controlling supply of current passing through the coils of the clutch 12.

The powertrain play adjustor component 8H is responsible for control of a powertrain play between the drive shaft of the electric motor 4 and the road wheels 3L and 3R. When start-condition for eliminating a powertrain play is met, turning the electric motor 4 after engagement of the clutch 12 eliminates the powertrain play.

A desired load torque (Th) calculating component 8E determines a desired value of load torque Th.

A desired load torque limiter component 8F compares the desired value of load torque Th to the maximum load capacity HQ of the generator 7. When the desired value of load torque Th exceeds the maximum load capacity HQ, the desired load torque limiter component 8F calculates a surplus torque ΔTb (ΔTb=Th−HQ) and sets the maximum load capacity HQ as Th. The desired load torque limiter component 8F calculates an engine torque upper limit TeM (TeM=Te−ΔTb, where Te is a current value of engine torque) and outputs the engine torque upper limit TeM to the engine controller 18.

The desired generator voltage (V) calculating component 8G sets the desired value of load torque for eliminating a powertrain play GaV that is determined by the powertrain play adjustor component 8H as the desired value of generator voltage V when Th is zero.

Figure 4:
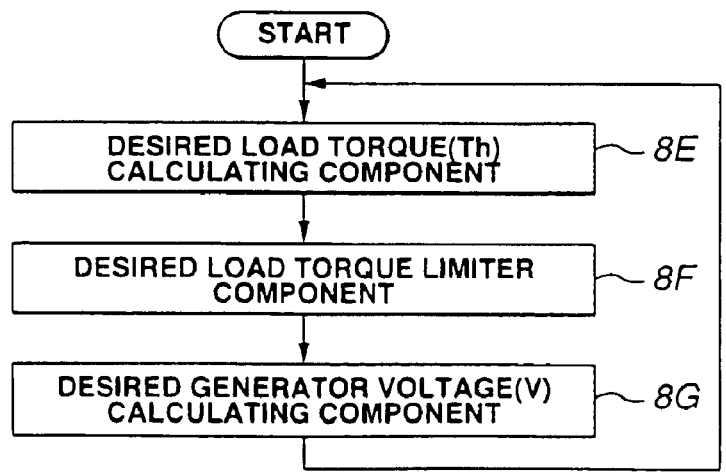
FIG. 4 is a flow diagram illustrating a main control routine executed by the 4WD controller.

The flow diagram in FIG. 4 illustrates a control routine. According to this control routine, in the exemplary implementation of the present invention, the components 8E, 8F and 8G are executed over the entire range of operation including operation to eliminate a powertrain play.

Figure 5:
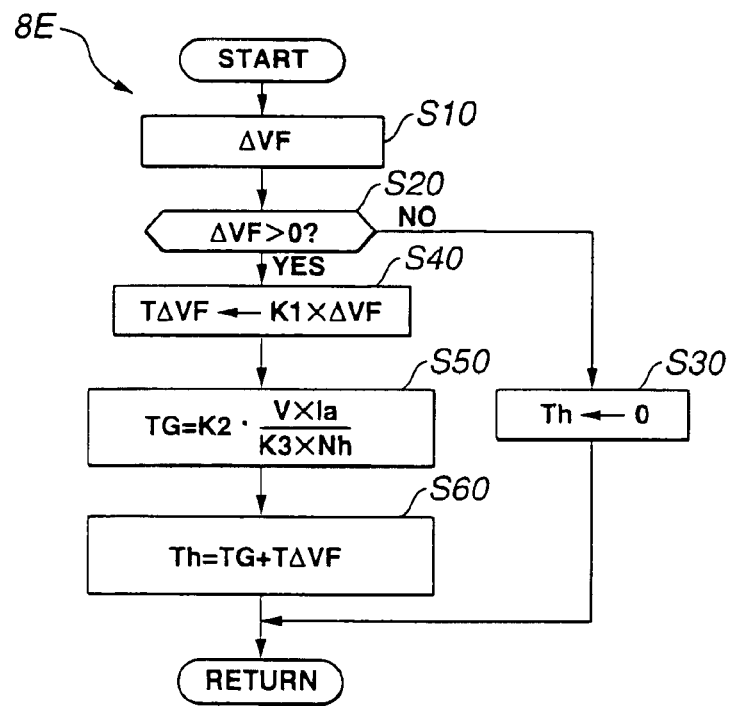
FIG. 5 is a flow diagram illustrating a control routine of control logic for desired load torque (Th) calculating component (8E).

The flow diagram in FIG. 5 illustrates a control routine for software implementation of the desired load torque (Th) calculating component 8E.

In box S10, the 4WD controller 8 determines a slip speed ΔVF, which is an amount of acceleration slip of the front road wheels 1L and 1R. The slip ΔVF expressed as:

$$\Delta VF = V_{WF} - V_{WR} \tag{1}$$

$$= \frac{V_{WFL} + V_{WFR}}{2} - \frac{V_{WRL} + V_{WRR}}{2}$$

where:

$V_{WF}$ is the average speed of front road wheels;

$V_{WR}$ is the average speed of rear road wheels;

$V_{WFL}$ is the wheel speed of a front left road wheel;

$V_{WFR}$ is the wheel speed of a front right road wheel;

$V_{WRL}$ is the wheel speed of a rear left road wheel;

$V_{WRR}$ is the wheel speed of a rear right road wheel.

In the next box S20, the 4WD controller 8 determines whether or not the slip ΔVF is greater than a predetermined value of 0 (zero), for example, if this is not the case (ΔVF≦0), the control logic goes to box S30. If this is the case (ΔVF>0), the control logic goes to box S40.

In box 530, the 4WD controller 8 sets 0 (zero) as the desired value of load torque Th (Th←0) before returning to a start point of the control routine.

In box 540, the 4WD controller 8 computes an engine torque TΔVF that is to be absorbed to suppress the slip ΔVF. This torque TΔVF is expressed as:

$$T\Delta VF = k1 \times \Delta VF \tag{2}$$

where: k1 is a gain that has been determined by field tests or simulation.

In the next box S50, the 4WD controller 8 computes a current value of load torque TG. The current value of load torque TG is expressed as:

$$TG = k2 \times \frac{V \times Ia}{k3 \times Nh} \tag{3}$$

where:

V is the voltage of generator 7;

Ia is the armature current of generator 7;

Nh is the revolution speed of generator 7;

K3 is efficiency; and

K2 is coefficient.

In the next box 560, the 4WD controller 8 computes a desired value of load torque Th before returning to the start point. The desired value of load torque Th is expressed as:

$$Th = TG + T\Delta VF \tag{4}$$

Figure 6:
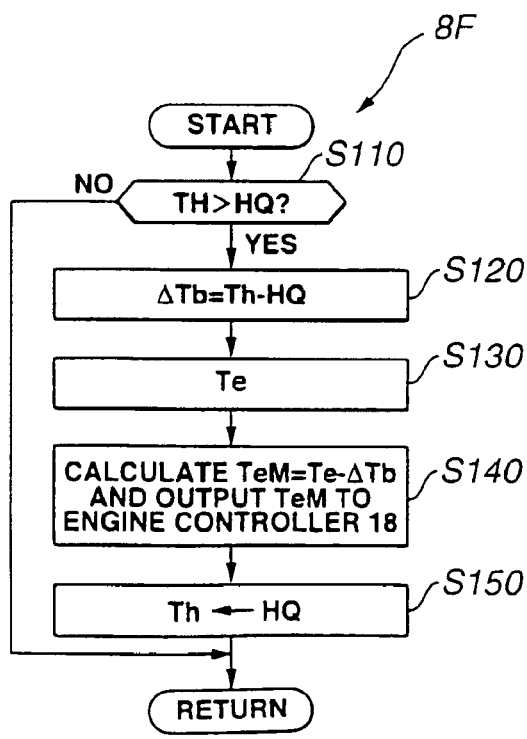
FIG. 6 is a flow diagram illustrating a control routine of control logic for desired load torque limiter component (8F).

The flow diagram in FIG. 6 illustrates a control routine for software implementation of the desired load torque limiter component 8E.

In box S110, the 4WD controller 8 determines whether or not the desired value of load torque Th exceeds the maximum load capacity HQ of the generator 7. If this is the case (Th>HQ), the control logic goes to box S120. If this is not the case (Th≦HQ), the logic returns to a point of start.

In box S120, the 4WD controller 8 computes a surplus torque ΔTb, which is expressed as:

$$\Delta Tb = Th - HQ \tag{5}$$

Figure 15:
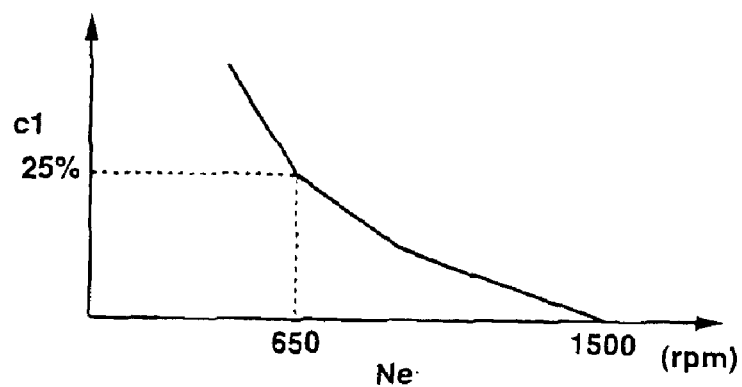
FIG. 15 is a graph illustrating another example of desired varying of generator command (c1) with different values of engine speed (Ne).

In the next box S130, the 4WD controller 8 determines a current value of engine torque Te based on APO and Ne, which are provided by the output signals of the accelerator pedal sensor 60 and engine revolution sensor 21. In determining the current value of engine torque Te, the 4WD controller 8 may use a look-up map as illustrated in FIG. 15 of U.S. Pat. No. 6,434,469 B1 issued Aug. 13, 2002, which has been incorporated herein by reference in its entirety.

In box S140, the 4WD controller 8 computes an engine torque upper limit TeM that is expressed as:

$$TeM = Te - \Delta Tb \quad (6)$$

Figure 9:
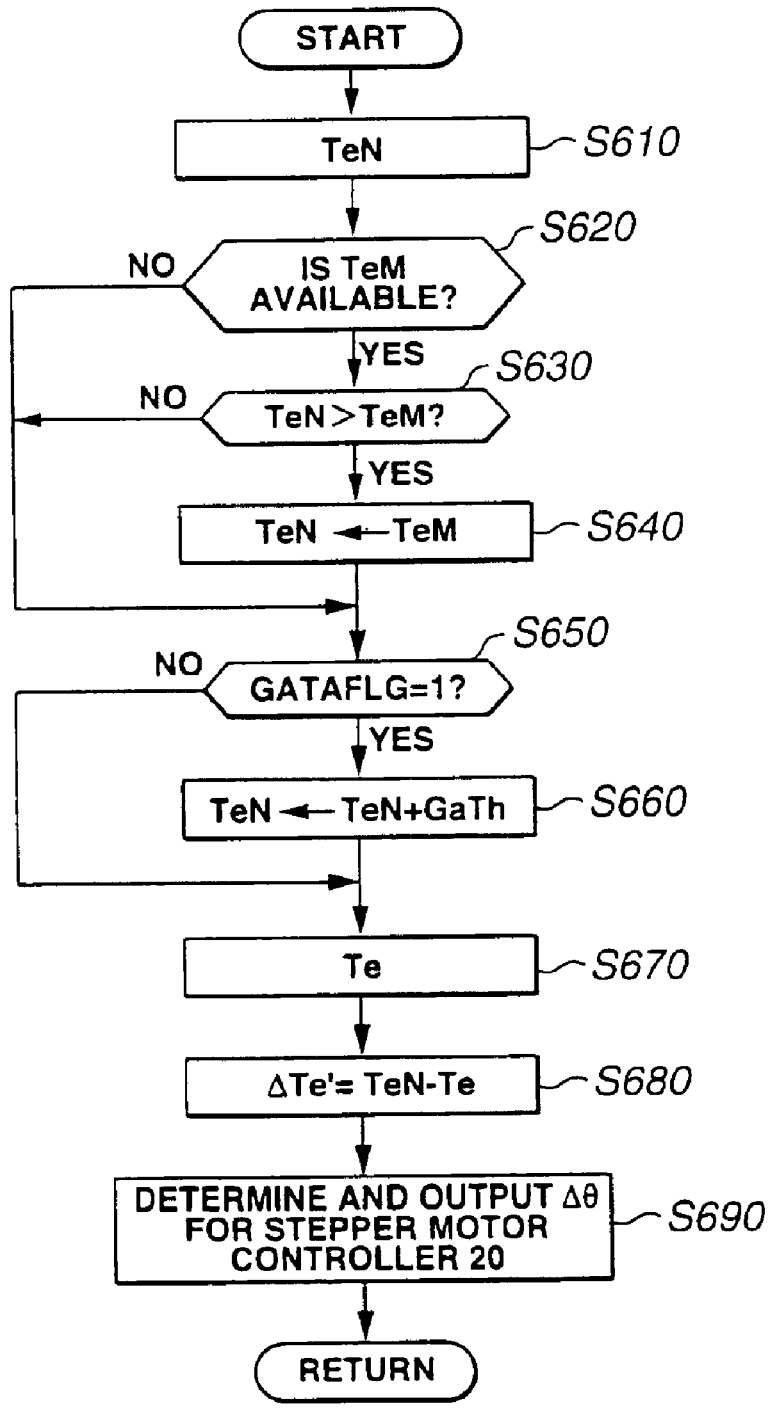
FIG. 9 is a flow diagram of a control routine for operating an engine controller (18) to drop engine torque by an amount as much as a surplus ($\Delta$Tb) of desired load torque (Th).

In the same box S140, the 4WD controller 8 outputs the engine torque upper limit TeM to the engine controller 18 (see box S620 in FIG. 9).

In the next box S150, the 4WD controller 8 sets the maximum load capacity HQ as the desired value of load torque Th to be applied to the engine 2 by the generator 7.

Figure 7:
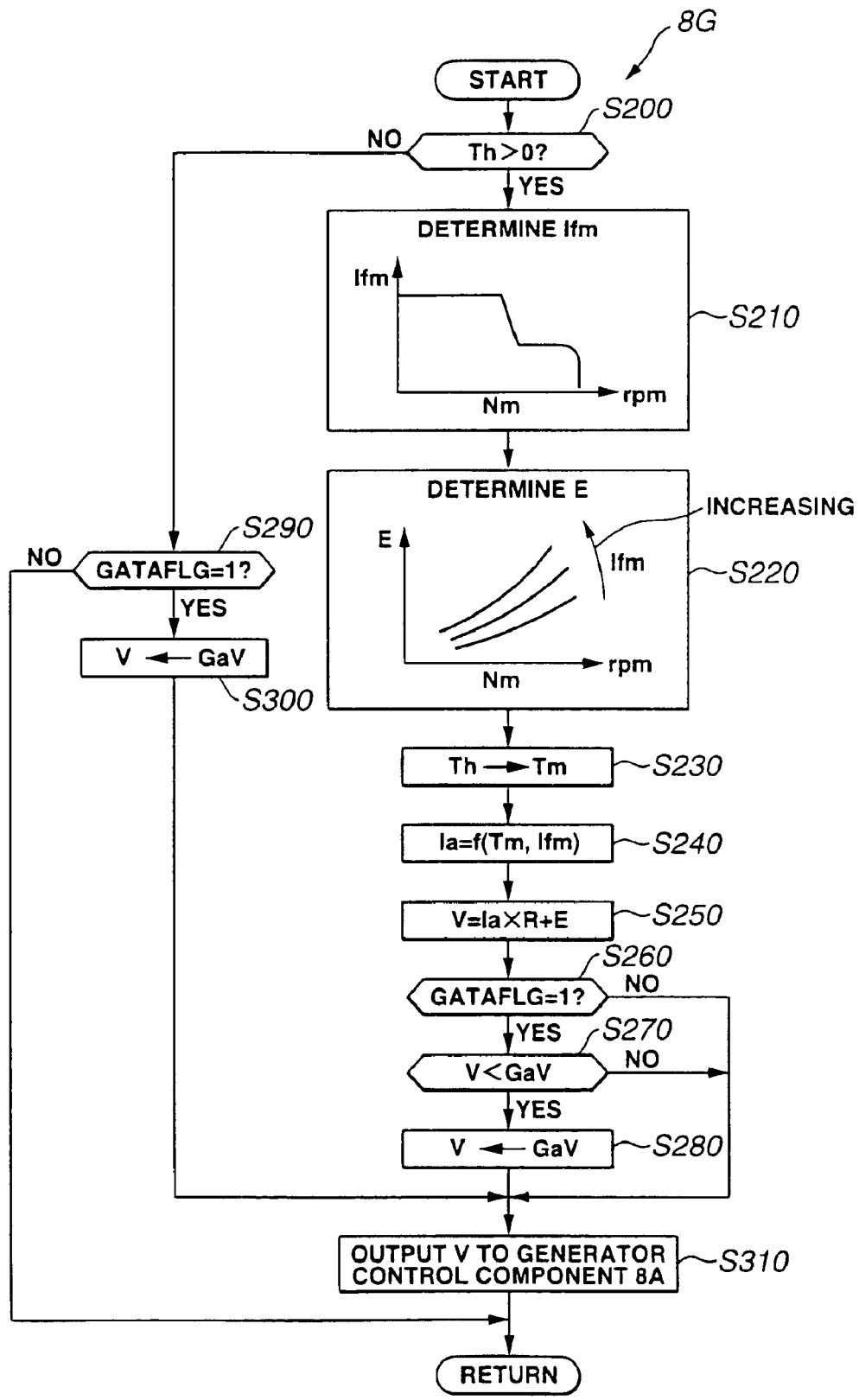
FIG. 7 is a flow diagram illustrating a control routine for desired generator voltage (V) calculating component (8G).

The flow diagram in FIG. 7 illustrates a control routine for software implementation of the desired generator voltage (V) calculating component 8G.

In box S200, the 4WD controller 8 determines whether or not the desired value of load torque Th is greater than 0 (zero). If this is the case (Th>0), as the front road wheels 1L and 1R are subject to slip, the control logic goes to box S210. If this is not the case (Th=0), as there is no slip, the control logic returns to a point of start of the control routine.

In box S210, the 4WD controller 8 inputs information of motor speed Nm from the motor speed sensor 26. The 4WD controller 8 determines a desired value of motor field current Ifm against the motor speed Nm from, for example, a look-up table. The 4WD controller 8 sends the determined desired value of motor field current Ifm to the motor control component 8C.

With regard to varying of desired value of motor field current Ifm with the motor speed Nm, the motor field current Ifm is kept constant over a range of revolution speeds lower than a predetermined value, but it is lowered at high revolution speeds equal to or exceeding the predetermined value as shown in the box S210.

Unless the motor field current Ifm is lowered at such high revolution speeds, the motor induced voltage E is elevated, making it difficult to secure flow of motor armature current Ia needed to generate sufficiently high motor torque required at such high revolution speeds. Thus, at high revolution speeds equal to or exceeding the predetermined value, the elevation of the induced voltage E is prevented by lowering the motor field current Ifm, securing flow of motor armature current Ia for generation of sufficiently high motor torque Tm.

In the next box S220, the 4WD controller 8 determines motor induced voltage E against the desired value of motor field current Ifm and the motor speed Nm from, for example, a look-up map.

In box S230, the 4WD controller 8 computes a desired value of motor torque Tm using the desired value of load torque Th that has been determined at the control routine in FIG. 6. Motor torque Tm is expressed as, $$Tm = \frac{Th \times Ne \times \eta_{ge} \times \eta_{mot}}{Nm} \quad (7)$$

where:

Tm is the motor torque;

Nm is the motor speed;

Th is the load torque;

Ne is the engine speed;

$\eta_{ge}$ is the efficiency of generator; and $\eta_{mot}$ is the efficiency of motor.

In the next box S240, the 4WD controller 8 determines a desired value of motor armature current Ia as a function of the desired value of motor torque Tm and the desired value of motor field current Ifm.

In the next box S580, the 4WD controller 8 computes a desired value of generator voltage V, which is expressed as:

$$V = Ia \times R + E \quad (8)$$

where: R is the sum of resistance of cable 9 and that of coil of electric motor 4.

In the next box S260, the 4WD controller 8 determines whether or not a flag GATAFLG is set (GATAFLG=1). The flag GATAFLG is controlled by the powertrain play adjustor component 8H. The flag GATAFLG is set when the powertrain play adjustor component 8H determines start-condition for powertrain play elimination (PPE) is met The flag GATAFLG is cleared (GATAFLG=0) when the powertrain play adjustor component 8H subsequently determines that end-condition for PPE is met. The powertrain play adjustor component 8H is later described along with the flow diagram in FIG. 8.

If, at box S260, the 4WD controller 8 determines that the flag GATAFLG is cleared (GATAFLG=0), the control logic goes to box S310. If, at box S260, the 4WD controller 8 determines that the flag GATAFLG is set (GATAFLG=1), the control logic goes to box S270.

Figure 8:
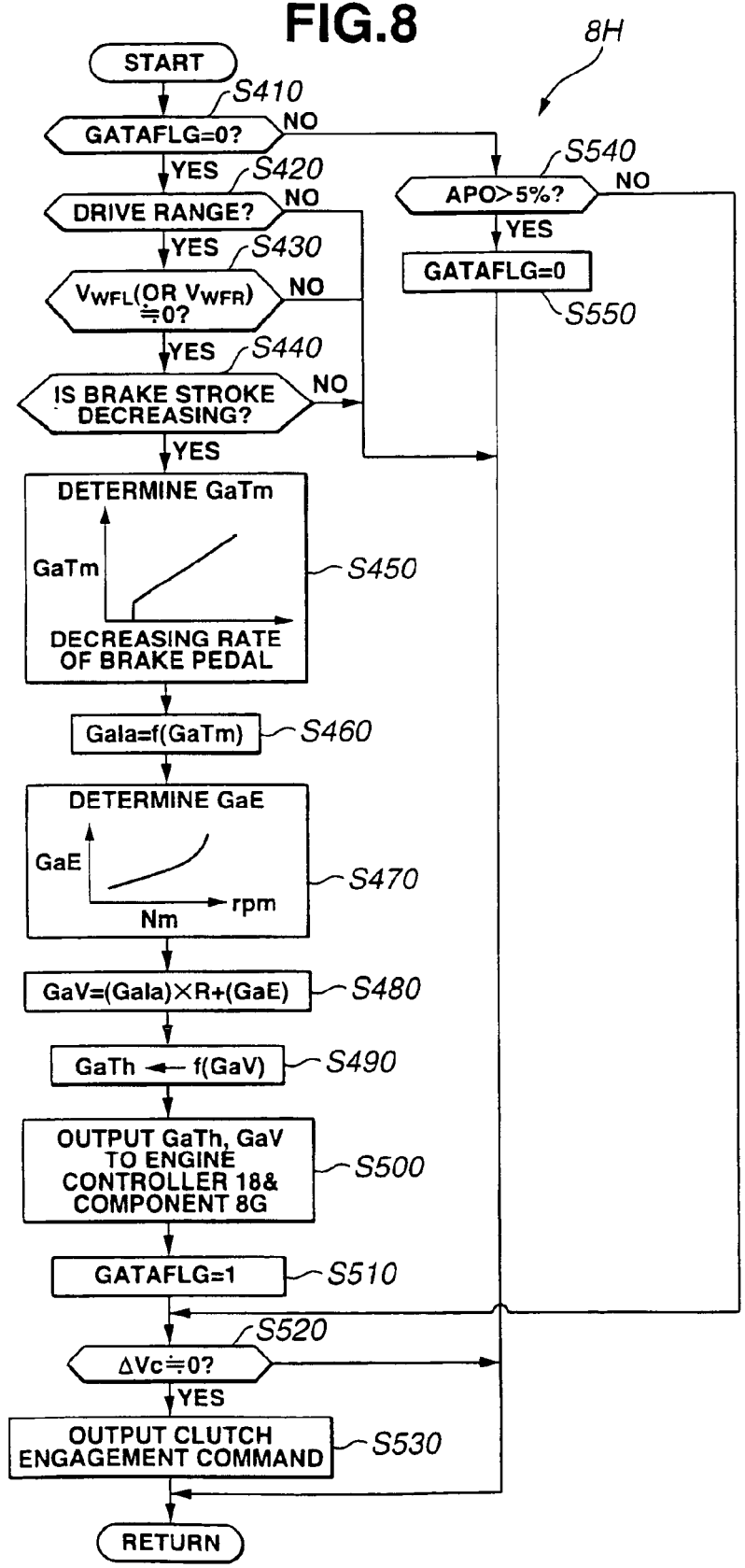
FIG. 8 is a flow diagram of a control routine for play adjustor component (8H) for PPE.

In box S270, the 4WD controller 8 determines whether or not the desired value of generator voltage V, which has been determined in box S250, is less than a desired value of generator voltage for PPE GaV, which has been determined in box S480 of the flow diagram in FIG. 8 if this is the case (V<CaV), the control logic goes to box S280. If this is not the case (V≧GaV), the control logic goes to box S310.

In box S280, the 4WD controller 8 sets GaV as the desired value of generator voltage V.

With reference back to box S200, if, at box S200, the desired value of load torque Th is zero, the control logic goes to box S290

In box S290, the 4WD controller 8 determines whether or not the flag GATAFLG is set. If this is the case (GATAFLG=1), the control logic goes to box S300. If this is not the case (GATAFLG=0), the control logic returns to a start or rest point.

In box S300, the 4WD controller 8 sets GaV as a desired value of generator voltage V. After box S300, the control logic goes to box S310.

In box S310, the 4WD controller 8 outputs the desired value of generator voltage V to the generator control component 8A.

According to the flow diagram in FIG. 7, the desired value of generator voltage V is determined in box S250 after due consideration of the electric motor 4. The manner of determining the desired value of generator voltage is not limited to this illustrated example. If the case permits, a desired value of generator voltage V may be directly determined as a function of the desired value of load torque Th.

The flow diagram in FIG. 8 illustrates software implementation of the powertrain play adjustor component 8H.

As mentioned before, the flag GATAFLG is set (GATAFLG=1) in box S510 immediately after start-condition for PPE has been met in boxes S420, S430 and S440. Subsequently, the flag GATAFLG is cleared (GATAFLG=0) in box S550 immediately after end-condition for PPE has been met in box S540.

In box S410, the 4WD controller 8 determines whether or not the flag GATAFLG is cleared (GATAFLG=0). If this is the case (GATAFLG=0), the control logic goes to box S420. If this is not the case (GATAFLG=1), the control logic goes to box S540.

In box S420, the 4WD controller 8 determines based on the output signal of the shift detector 32 whether or not the operator shifts to any one of drive ranges (e.g., D, R, 1, 2). If this is the case, representing there is torque transmission form the engine 2 to the front road wheels 1L and 1R, the control logic goes to box S430 if this is not that case, the control logic returns to the start point.

In box S430, the 4WD controller 8 determines whether or not the wheel speed of the front road wheels is zero or in the proximity of zero. This determination may be made by looking into the front left road wheel speed $V_{WFL}$ or the front right road wheel speed $V_{WFR}$ or the average of the front road wheel speeds $V_{WF}$. If, at box S430, the front road wheel speed is zero or in the proximity of zero, the control logic goes to box S440 because this is the case where the vehicle is about to move. If this is not the case, the control logic returns to start point of the control routine.

If the circumstances require PPE while the vehicle is moving, the content of interrogation in the box S430 needs to change. The wheel speed is converted into motor speed, and it is determined based on the converted motor speed whether or not the motorspeed Nm may stay below an allowable upper limit. If this is the case, the process toward PPE continues and the control logic goes to box S440. If this is not the case, the control logic returns to the start point.

In box S440, the 4WD controller 8 determines based on the output signal from the brake stroke sensor 35 whether or not the brake pedal 34 is displacing in a direction to release the brake pedal (or to reduce the operator brake demand). If this is the case, the control logic goes to box S450. If this is not the case, the control logic returns to the start point.

The content of interrogation in box S440 needs to change if a two-level switch is used to detect released state of the brake pedal 34. In this case, the 4WD controller determines whether or not the brake pedal 34 is released. If this is the case, the control logic goes to box S450. If this is not the case, the control logic returns to start point of the control routine.

Before further description on box S450 and onwards, it is to be remembered that the start-condition for PPE is met by releasing or having released the brake pedal 34 after shifting to any one of the drive ranges when the front road wheel speed is zero or in the proximity of zero (see boxes S420, S430 and S440). This is just one of various examples of software implementation of start-condition for PPE. In the implementation according to the present invention, the shift detector 32, the wheel speed sensors 27FL, 27FR, and the brake stroke sensor 35 support hardware aspect of a predictor component estimating the probability of driving the rear road wheels 3L, 3R. The control logic, which includes the boxes S420, S430 and S440, supports software aspect of the predictor component. In the implementation according to present invention, the estimation by the predictor indicates that a shift into a driven state of the rear road wheels 3L, 3R is imminent when the start-condition for PPE is met.

After the start-condition for PPE has been met, the 4WD controller 8 computes, in box S450, a decreasing rate of brake pedal stroke. Using a predetermined map or function as illustrated in box S450, the 4WD controller 8 determines a desired value of motor torque for PPE GaTm against the decreasing rate of brake stroke. In the illustrated example, when the absolute value of decreasing rate of brake stroke is less than a predetermined value, the desired value of motor torque for PPE GaTm is zero. But, when it is equal to or greater than the predetermined value, the desired value of motor torque for PPE GaTm is proportional to the absolute value of decreasing rate of brake pedal.

The desired value of motor torque for PPE GaTm may be kept unaltered above zero against variation of the absolute value of decreasing rate of brake pedal.

In the next box S460, the 4WD controller 8 computes a desired value of armature current for PPE GaIa as a function of the desired value of motor torque for PPE GaTm.

In box S470, the 4WD controller 8 determines motor induced voltage for PPE GaE against a single unaltered value of motor field current Ifm and the motor speed Nm from, for example, the illustrated characteristic. As mentioned before in connection with box S210 in FIG. 7, the value of motor field current Ifm is kept unaltered when the electric motor 4 operates at motor speeds lower than the predetermined value. Motor speeds used for PPE are always lower than this predetermined value. Thus, the value of motor field current Ifm is unaltered in determining motor induced voltage for PPE GaE in box S470.

In the next box S480, the 4WD controller 8 computes a desired value of generator voltage for PPE GaV, which is expressed as:

$$GaV = GaIa \times R + GaE \qquad (9)$$

In box S490, the 4WD controller 8 determines a desired value of load torque for PPE GaTh as a function of the desired value of generator voltage for PPE GaV.

In box S500, the 4WD controller 8 outputs the desired value of load torque for PPE GaTh to the engine controller 18 (see box S660 in FIG. 9), and it outputs the desired value of generator voltage for PPE GaV to the desired generator voltage (V) calculating component 8G (see boxes S260 and 270 in FIG. 7).

In box S510, the 4WD controller 8 sets the flag GATAFLG (GATAFLG=1) after setting the desired values for PPE GaTh and GaV.

In the next box S520, the 4WD controller 8 determines whether or not a difference ΔVc between a revolution speed of clutch input shaft and a revolution speed of clutch output shaft is equal to zero or in the proximity of zero. The revolution speed of clutch input shaft is given by multiplying the motor speed Nm with a reduction ratio of the reduction gearing 11. The revolution speed of clutch output shaft is given by multiplying the average wheel speed VwR with a gear ratio of the differential 13.

In box S520, if the difference ΔVc is zero or in the proximity of zero, the control logic goes to box S530. If this is not the case, the control logic returns to the start point In box S530, the 4WD controller 8 outputs a clutch engagement command to the clutch control component 8D. In response to the clutch engagement command, the clutch control component 8D initiates a clutch engagement sequence to bring the clutch 12 into engagement state.

The process in box S520 is provided to eliminate or suppress shocks upon engagement of the clutch 12. This process is not needed if the magnitude or nature of shocks is acceptable. The process in box S520 may be eliminated for eliminating powertrain play when the vehicle is about to move.

After box S530, the control logic returns to the start point.

Immediately after the flag GATAFLG has been set (GATAFLG=1) in box S510, the control logic goes from box S410 to box S540 in the subsequent execution of the routine.

In box S540, the 4WD controller 8 determines based on the output signal from the accelerator sensor 60 whether or not APO exceeds a predetermined value, e.g., 5%. If this is the case, the control logic goes to box S550. If this is not the case, the control logic goes to box S520.

It is to be noted that end-condition for PPE is met when APO exceeds the predetermined value 5% in box S540.

In box S550, the 4WD controller 8 clears the flag GATAFLG (GATAFLG=0) before returning to the start point.

If the clutch 12 has not been engaged, the 4WD controller 8 checks box S520 to find out whether or not condition for engagement of the clutch 12 is matured.

During period of time when the flag GATAFLG is set, the generator control component 8A regulates generator field current Ifh so that the generator 7 can apply voltage V at least as high as GaV to the electric motor 4 (see boxes S280 and S300 in FIG. 7). After the clutch 12 has been engaged, this causes the electric motor 4 to eliminate a powertrain play to establish a minimal torque transmission to the rear road wheels 3L, 3R.

The flow diagram in FIG. 9 illustrates operation of the engine controller 18.

In box S610, the engine controller 18 determines a desired value of engine torque TeN based on the output signal (APO) of the accelerator pedal sensor 60.

In the next box S620, the engine controller 18 determines whether or not the engine torque upper limit TeM (determined in box S140 in FIG. 6) is fed thereto from the 4WD controller 8. If this is the case, the control logic goes to box S640. If this is not the case, the control logic goes to box S650.

In box S630, the engine controller 13 determines whether or not the desired value of engine torque TeN is greater than the engine torque upper limit TeM. If this is the case, the control logic goes to box S640. If this is not the case, the control logic goes to box S650.

In box S640, the engine controller 18 sets the engine torque upper limit TeM as the desired value of engine torque TeN.

In the next box S650, the engine controller 18 determines whether or not the flag GATAFLG is set (GATAFLG=1). If this is the case, the control logic goes to box S660. If this is not the case, the control logic goes to box S670.

In box S660, the engine controller 18 increases the desired value of engine torque TeN by the desired value of load torque for PPE GaTh (determined in box S490 in FIG. 6).

In the next box S670, the engine controller 18 determines a current value of engine torque Te based on accelerator pedal opening APO and engine speed Ne in the same manner as the 4WD controller 8 does in box S130 in FIG. 6.

In the next box S680, the engine controller 18 computes a deviation ΔTe' that is expressed as:

$$\Delta Te' = TeN - Te \tag{10}$$

In the next box S690, the engine controller 18 determines a change Δθ in throttle opening angle θ for the deviation ΔTe' and outputs the determined change Δθ to the stepper motor controller 20, causing the sub throttle valve 16 to move accordingly.

This section provides description on how acceleration slip ΔVF is suppressed. Acceleration slip ΔVF takes place when torque transmitted to the front road wheels 1L, 1R from the engine 2 exceeds a threshold torque opposed to the road reaction force. Such phenomena will occur when operator steps on the floor for rapid acceleration from standstill or steps on the accelerator pedal 17 on slippery road surface. As illustrated in FIGS. 5–7, load torque Th, which is determined in response to the magnitude of acceleration slip, is applied to the engine 2 by the generator 7 in generating electric power. This reduces the driving torque toward the threshold torque, causing the acceleration slip to disappear.

The generated electric power is applied to the electric motor 4, thus applying motor torque to the rear road wheels 3L, 3R. This has accomplished enhanced acceleration with 4WD and suppressed acceleration slip.

As excessive amount of torque is converted into electric energy to drive the rear road wheels 3L, 3R, thus enhancing energy efficiency to provide excellent fuel economy.

This part time 4WD is advantageous over the conventional mechanical 4WD because loss is minimized by converting the excessive amount of torque into electric energy for the 4WD.

Referring to FIGS. 10A to 10G, the exemplary implementation according to the present invention is explained. FIG. 10A is a time chart illustrating varying of brake stroke of the brake pedal 34 with time. FIG. 10B is a time chart illustrating varying of APO with time, FIG. 10C is a time chart illustrating varying of wheel speed ($V_{WF}$, $V_{WR}$) with time. FIG. 10D is a time chart illustrating state of clutch 12 with time. FIG. 10E is a time chart illustrating varying of motor torque GaTm or Tm (or armature current GaIa or Ia) with time. FIG. 10F is a time chart illustrating varying of load torque GaTh or Th with time. FIG. 10G is a time chart illustrating varying of engine torque Te with time.

In FIGS. 10A to 10G, prior to the moment $t_0$, it is assumed that the vehicle operator has shifted to D (Drive) range with one's foot stepping on the brake pedal 34.

At the moment $t_0$, the operator begins to release the brake pedal 34. With reference to FIG. 10D, as the wheel speed is zero, the condition ΔVc=0 is met (see box S520 in FIG. 8), so that the clutch 12 is engaged to take "ON" state. Upon and after the moment $t_0$, the desired value of generator voltage for PPE GaV and the desired value of load torque for PPE GaTh are determined in boxes S480 and S490 in FIG. 8. In response to the desired value of generator voltage for PPE GaV, the generator 7 applies load torque as high as the desired value of load torque for PPE GaTh to the engine 2. As shown by the fully drawn line in FIG. 10F, the generator 7 produces electric power as much as the desired value of load torque for PPE GaTh. As shown by the fully drawn line in FIG. 10E, armature current GaIa (motor torque GaTm) passes through the electric motor 4. In response to the desired value of load torque for PPE GaTh, the desired value of engine torque TeN increases in box S660 in FIG. 9. Thus, as shown by the fully drawn line in FIG. 10G, the engine torque Te increases. With the motor torque GaTm as illustrated in FIG. 10E, the electric motor 4 turns to eliminate powertrain play that exists between the electric motor 4 and the rear road wheels 3L, 3R. After the powertrain play has been eliminated, the motor torque GaTm is applied to the rear road wheels 3L, 3R. The setting of the magnitude of motor torque GaTm that is determined in box S450 is such that a minimal small torque is applied to the road wheels 3L, 3R. The application of such torque will not move the vehicle. According to the exemplary implementation of the present invention, this minimal torque applying state continues until the moment $t_3$ when the operator steps on the accelerator pedal 17 beyond the predetermined value of 5%.

After the moment $t_3$, acceleration slip ΔVF occurs as shown in FIG. 10C. In order to suppress the occurrence of the acceleration slip ΔVF, the generator 7 increases electric power generation (see FIG. 10F) to cause an increase in armature current Ia (see FIG. 10E), while the engine 2 increases torque Te to cope with an increase in APO (see FIG. 10t).

For smooth shift into 4WD without any delay, the exemplary implementation of the present invention aims at eliminating powertrain play before the operator steps on the accelerator pedal 17 beyond the predetermined value of 5%. To accomplish this aim, the desired value of motor torque for PPE CaTm determined in box S450 is proportional to the decreasing rate of brake stroke of the brake pedal 34. Increasing the motor torque Tm shortens the time required to eliminate the powertrain play after the moment $t_0$. This is based on the empirically determined thought that operator tends to step on the accelerator pedal immediately after quick release of the brake pedal In FIGS. 10A to 10G, broken line curves illustrate the case where the operator steps on the accelerator pedal 17 at moment $t_1$ immediately after quick release of the brake pedal 34.

As explained before in connection with box S420 in FIG. 8, the exemplary implementation of the present invention does not carry out the powertrain play elimination when the operator shifts to non-drive range, e.g., Park, Neutral, Thus, unnecessary consumption of electric energy is avoided.

Interrogation box similar to box S420 may be provided immediately upstream of box S540 or immediately downstream in the "NO" path of box S540 if it is desired to further save electric energy.

As shown in box S540 in FIG. 8, the end-condition for PPE is met when the predetermined value of 5% is exceeded by APO. If 0% is set as the predetermined value, movement of the vehicle before shifting into 4WD mode causes the powertrain play to occur again. Thus, smooth shift into 4WD without any delay cannot be expected. Thus, the setting should be such that the predetermined value is acceleration opening at which the vehicle has started moving and is about to produce acceleration slip.

In the exemplary implementation of the present invention, the generator 7 is used as a source of electric power supplied to the electric motor 4. The exemplary implementation of the present invention is not limited to the use of the generator 7 as the source of electric power. The implementation of the present invention is applicable to a system using a battery as a source of electric power to the electric motor. The implementation of the present invention is applicable also to a system wherein a battery and a generator are used as a source of electric power to the electric motor 4.

In the exemplary implementation of the present invention, the engine 2 is used as a main driving source of the road wheels. The exemplary implementation of the present invention is not limited to the system using the engine as the driving source. The exemplary implementation is applicable to a system wherein other prime mover, such as, a motor, is used as a main driving source of the road wheels.

With reference mainly to FIGS. 11 to 19, another exemplary implementation of the present invention will be described.

This and previously discussed implementations are alike in many respects. Thus, like reference numerals are used to designate like components or portions throughout the specification.

This implementation is substantially the same as the fist discussed implementation. Thus, a 4WD controller used in this implementation includes a generator control component 8A, a relay control component 8B, a motor control component 8C, and a clutch control component 8D, which are the same as those of the first discussed implementation.

This 4WD controller includes a desired load torque (Th) calculating component 8E, and a desired load torque limiter component 8F, which are the same as those of the first discussed implementation.

The 4WD controller includes a desired generator voltage (V) calculating component 8G*, which is alike but slightly different from the desired generator voltage (V) calculating component 8G of the first discussed implementation.

Figure 11:
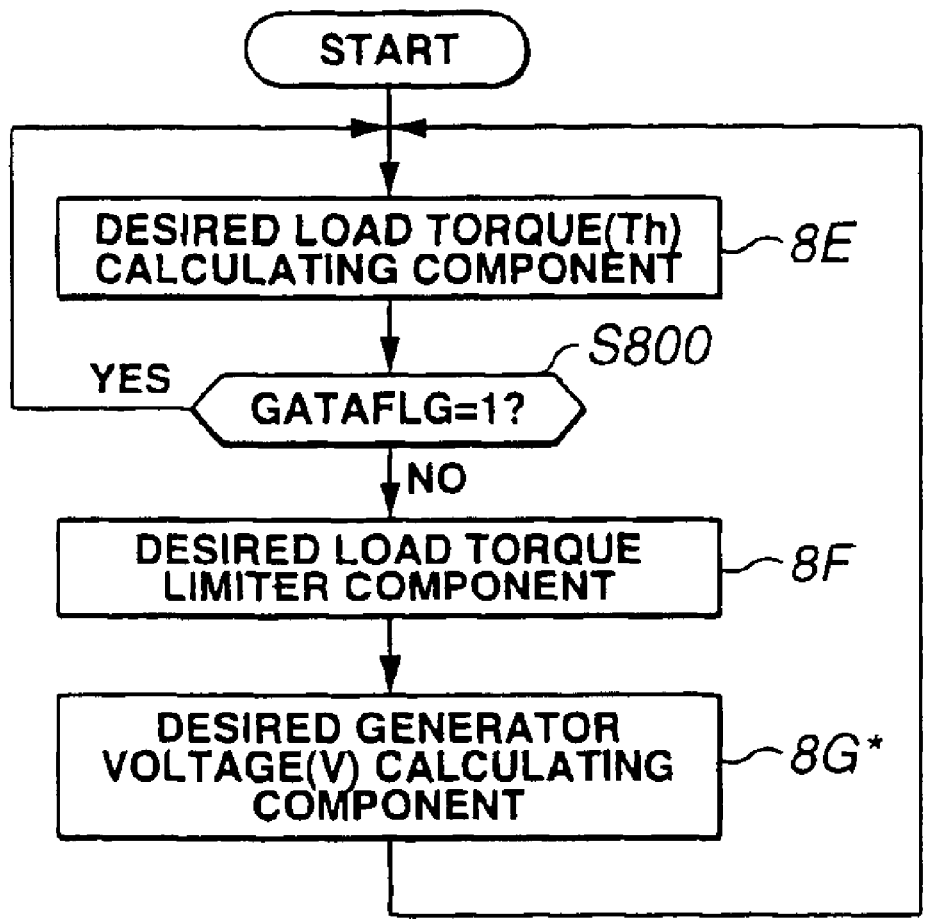
FIG. 11 is a flow diagram illustrating a modified main control routine.

As different from the illustrated routine in FIG. 4, a box S800 is provided as illustrated in FIG. 11.

In FIG. 11, the control logic goes from the desired load torque (Th) calculating component 8E to box S800. In the same manner as the first discussed implementation, the 4WD controller executes the control routine BE illustrated in FIG. 5.

In box S800, the 4WD controller determines whether or not a flag GATAFLG is set (GATAFLG=1). If this is the case, the control logic will not go to the desired load torque limiter component 8F followed by the desired generator voltage (V) calculating component 8G*. This is because the PPE (powertrain play elimination) is in progress so that a shift to 4WD control has to be prohibited.

If, in box S800, the 4WD controller determines that the flag GATAFLG is cleared (GATAFLG=0), the control logic goes to the desired load torque limiter component 8F. In the same manner as the first discussed implementation, the 4WD controller executes the control routine 8F illustrated in FIG. 6.

Figure 12:
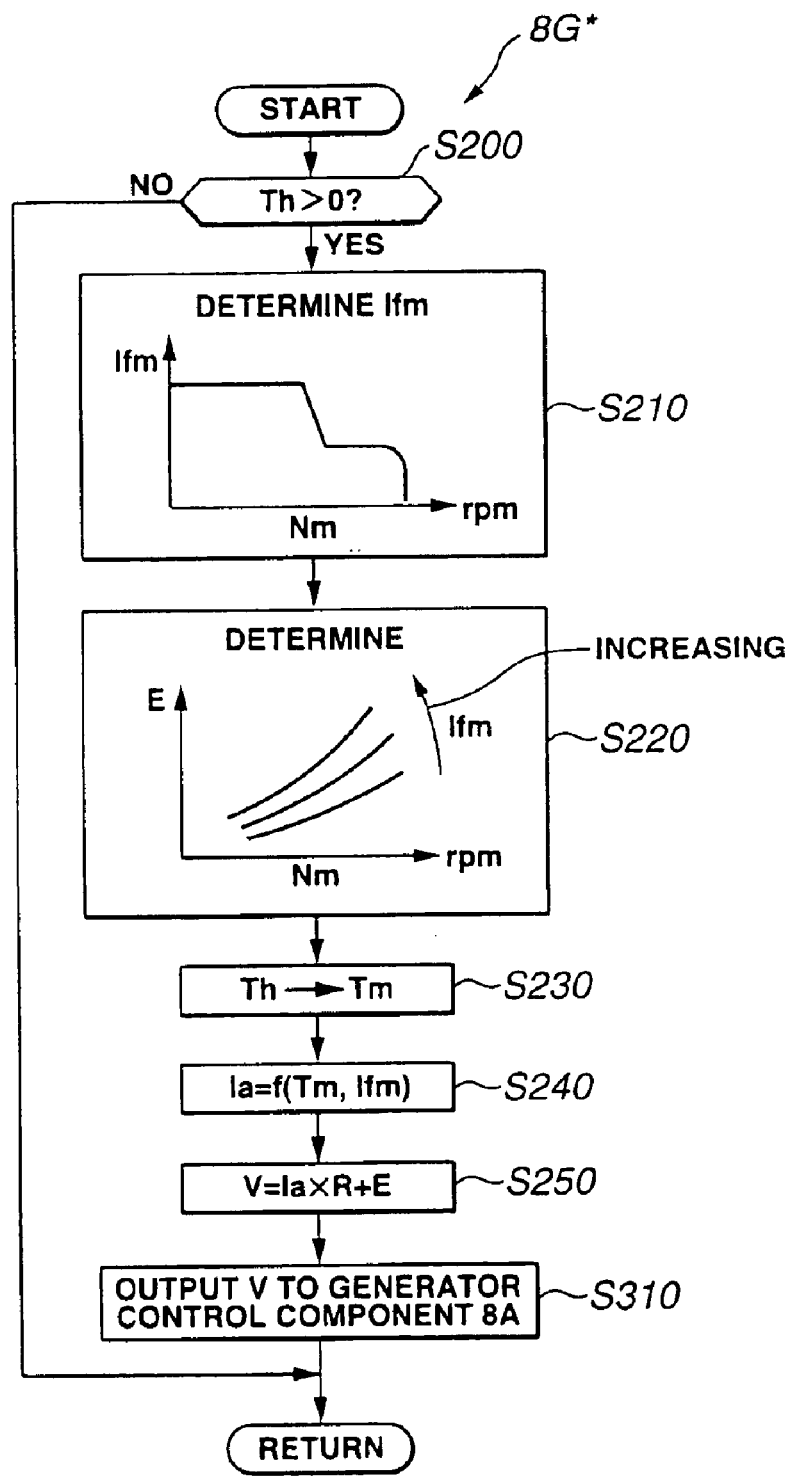
FIG. 12 is a flow diagram illustrating another control routine for desired generator voltage (V) calculating component (8G*).

Next, the control logic goes to the desired generator voltage (V) calculating component 8G*. The flow diagram in FIG. 12 illustrates a control routine of this component 8G*. The control routine 8G* in FIG. 12 is substantially the same as the control routine 8G in FIG. 7. The control routine 8G* is different from the control routine 8G in that there are no boxes corresponding to boxes S260, S270, S280, S290 and S300. This is because the control routine 8G* covers determination of a desired value of generator voltage V for 4WD control In the exemplary implementation of the present invention, the 4WD controller includes a play adjustor component 8H as illustrated in FIG. 13.

Figure 13:
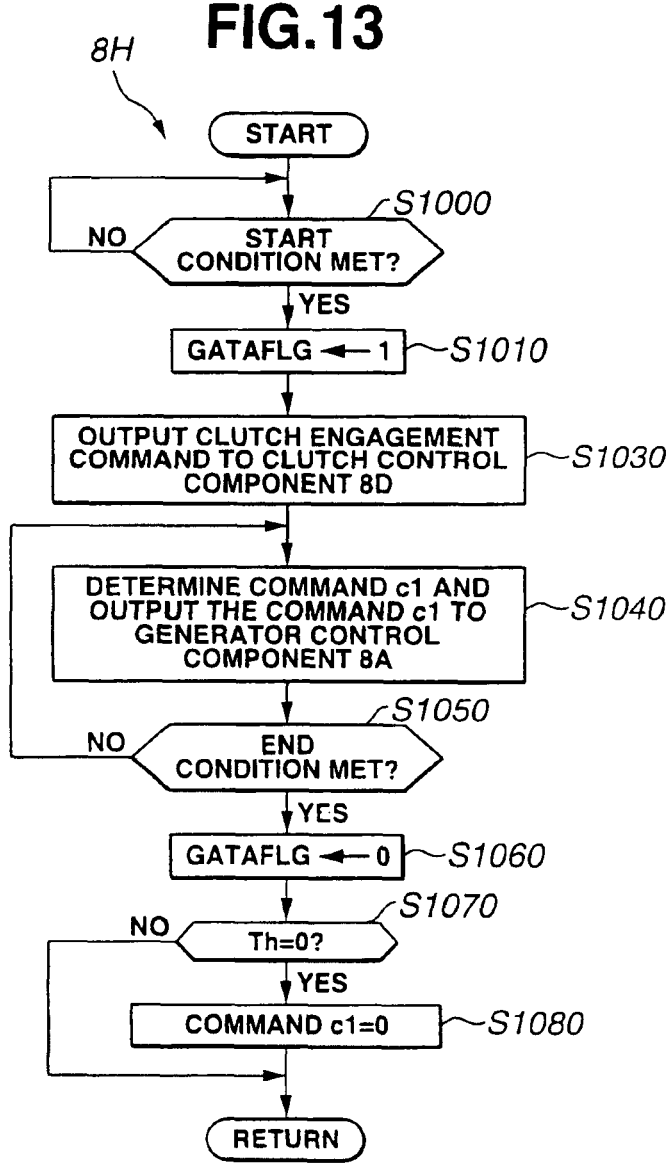
FIG. 13 is a flow diagram of another control routine for play adjustor component (8H) for PPE.

The flow diagram in FIG. 13 illustrates a control routine for the play adjustor component 8H used in this implementation.

In box S1000, the 4WD controller determines whether or not start-condition for PPE is met. If this is the case, the control logic goes to box S1010. If this is not the case, the control logic waits until the start-condition for PPE is met. The start-condition for PPE is discussed in detail later.

In box S1010, the 4WD controller sets the flag GATAFLG (GATAFLG=1).

In the next box S1030, the 4WD controller outputs a clutch engagement command to the clutch control component 8D. In response to the clutch engagement command, the clutch control command 8D initiates a clutch engagement sequence to bring the clutch 12 into engagement state. After box S1030, the control logic goes to box S1040.

In box S1040, the 4WD controller determines generator command c1 (duty) to be applied to a voltage regulator 22 (see FIG. 2) and output it to the generator control component 8A for keeping electric power constant by regulating the generator 7. Assuming the engine 2 idles at a fixed value of engine speed Ne, and generator field current Ifh is regulated by PWM (pulse width modulation), the generator command ca may be fixed to a predetermined PWM value (%), e.g., 25%, in order to keep electric power constant.

The output of the generator 7 increases as engine speed Ne increases. If the predetermined generator command c1 for normal engine idle operation after warm-up is used unaltered for keeping the generated output during the engine warm-up, the armature current Ia of the electric motor 4 becomes high to produce motor torque greater than necessary. This greater motor torque may cause unacceptable shocks to occur upon completion of elimination of powertrain play. In order to compensate for an increase in generated output due to an increase in engine speed Ne, the generator command c1 may be altered in response to a change in engine speed Ne. For example, the generator command c1 is altered in response to engine speed Ne to keep generated output at such a level as to restrain the maximum of motor torque below a predetermined value.

Figure 14:
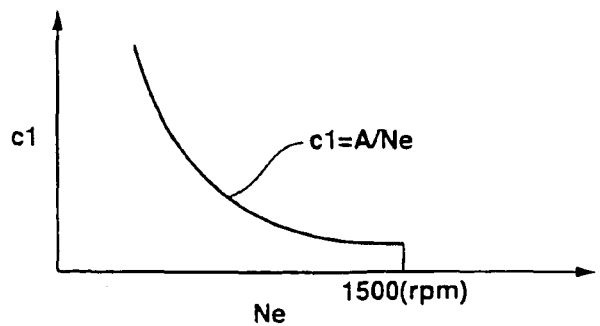
FIG. 14 is a graph illustrating one example of desired varying of generator command (c1) with different values of engine speed (Ne).

As illustrated in FIG. 14, the generator command c1 may be determined as:

$$c1=A/Ne \qquad (11)$$

where: A is the preset value determined by simulation or tests to suppress the shock to an acceptably low level.

FIG. 15 is a map defining desired values of generator command c1 against different values of engine speed Ne. The generator command c1 may be determined by looking into the illustrated map.

In the implementation, the motor field current Ifm is fixed at a PWM value of 30%, which indicates 30% of the maximum flow of field current allowed to pass through the electric motor 4.

With continuing reference to FIG. 13, the control logic goes to box S1050 after box S1040. In box S1050, the 4WD controller determines whether or not end-condition for PPE is met. If this is not the case, the control logic returns to box S1040. If this is the case, the control logic goes to box S1060. The end-condition for PPE is discussed later in detail.

In box S1060, the 4WD controller clears the flag GATAFLG (GATAFLG=0).

In the next box S1070, the 4WD controller determines whether or not the desired value of load torque Th (see boxes S30 and S60 in FIG. 5) is zero. In this implementation, it is considered that condition for shift into 4WD is met when the desired value of load torque Th becomes greater than zero. Thus, if the desired value of load torque Th is zero, the condition for shift into 4WD is not yet met.

If, in box S1070, the desired value of load torque Th is greater than zero, the control logic returns to start point. If, in box S1070, the desired value of load torque Th is zero, the control logic goes to box S1080.

In box S1080, the 4WD controller sets 0 (zero) as the generator command c1. As the generator command c1 is zero, the voltage regulator 22 (see FIG. 2) prohibits any flow of field current (Ifh=0). Thus, the generator 7 ceases generation.

This section provides description on various examples of start-condition for PPE. One example is determination on a reduction in operator effort to depress the brake pedal 34 with operator shift into any one of the drive ranges (D, R, 1, 2). Another example is determination on the full release of the brake pedal 34 with operator shift into any one of the drive ranges (D, R, 1, 2). Another example is determination on operator shift into any one of the drive ranges (D, R, 1, 2). Another example is determination on a reduction in operator effort to depress the brake pedal 34. Another example is determination on the full release of the brake pedal 34. Other examples may be available. One of such example may be used alone or in combination with one of the above listed examples.

This section provides description on logic to determine whether start-condition for another round of PPE is met after the first round of PPE has been completed.

This logic is composed of determination that the desired value of load torque Th is zero in combination with the determination on a reduction in operator effort to depress the brake pedal 34 or the determination on operator shift into any one of the drive ranges (D, R, 1, 2) or the determination on the full release of the brake pedal 34. In this case, after another round of PPE has been completed with operator shift into any one of the drive ranges, other round of PPE is not recommended until the subsequent operator shift into non-drive range, e.g., P (Park) or N (Neutral), even if a shift into 4WD does not occur.

Further, one may establish logic to prohibit another round of PPE until the beginning of 4WD once one round of PPE was completed. This logic may include scenario that another round of PPE is allowed upon determination on a reduction in operator effort to depress the brake pedal 34 or the determination on operator shift into any one of the drive ranges (D, R, 1, 2) or the determination on the full release of the brake pedal 34 immediately after the operator shift into the P or N.

With reference to FIGS. 16 to 19, there are four examples of logic to determine whether or not the end-condition for PPE is met.

Figure 16:
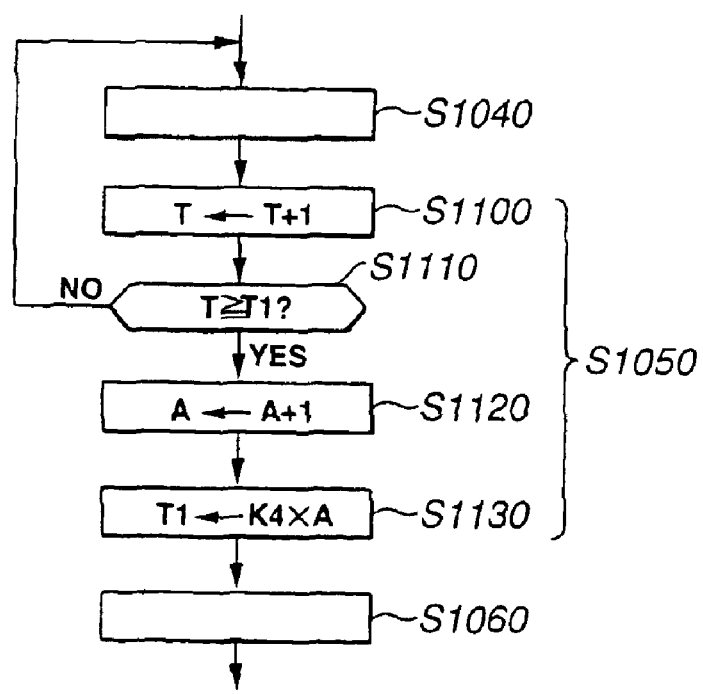
FIG. 16 is the portion of a flow diagram, which illustrates one example of end condition for PPE.

The fragmentary flow diagram in FIG. 16 illustrates one example of logic to determine whether or not the end-condition for PPE is met.

In box S1100, the 4WD controller counts up timer T by one, In the next box S1110, the 4WD controller determines whether or not the timer T is greater than or equal to a preset period of time T1. If, in box S1110, the timer T is less than the preset period of time T1, the control logic returns to box S1040 (see FIG. 13) because the end-condition for PPE is not met. If, in box S1110, the timer T is greater than or equal to the preset period of time T1, the control logic goes to box S1120 because the end-condition for PPE has been met.

In box S1120, the 4WD controller counts up a starting frequency counter A by one. In the next box S1130, the 4WD controller computes the preset period of time T1, which is expressed as:

$$T1=K4 \times A \qquad (12)$$

where: K4 is the constant.

After box S1130, the control logic goes to box S1060 (see FIG. 13).

In FIG. 16, boxes S1120 and S1130 are provided to modify the preset period of time T1. If desired, the preset period of time T1 may be a fixed value. In this case, the boxes S1120 and S1130 are omitted.

Powertrain play tends to become large due to wear of the powertrain components including the clutch 12. The computation in boxes S1120 and S1130 is designed to increase the preset period of time T1 taking into account the progress of wear. The preset period of time T1 increases gradually with the accumulated number of repetitions of PPE. Empirically, it is confirmed that the accumulated number of executions of PPE grows with the accumulated number of repetitions of 4WD operation. Thus, it may be safely said that the preset period of time T1 increases with the accumulated number of repetitions of 4WD operation.

Figure 17:
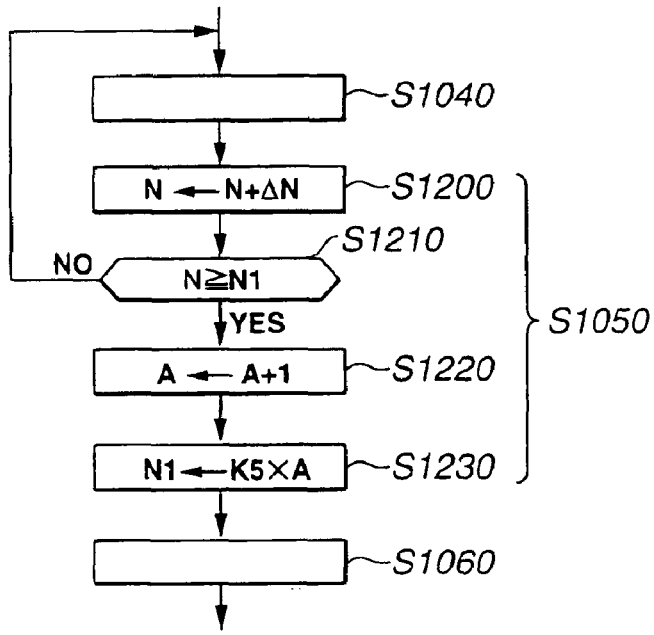
FIG. 17 is the portion of a flow diagram, which illustrates another example of end condition for PPE.

The fragmentary flow diagram in FIG. 17 illustrates another example of logic to determine whether or not the end-condition for PPE is met.

In box S1200, the 4WD controller increases the number of motor revolutions N by a predetermined increment of ΔN from the start of PPE. In the next box S1210, the 4WD controller determines whether the number of motor revolutions N is greater than or equal to a preset number of revolutions N1. If this is the case, the control logic goes to box S1220 because the end-condition has been met. If this is not the case, the control logic returns to S1040 (see FIG. 13).

In box S1220, the 4WD controller counts up a starting frequency counter A by one. In the next box S1230, the 4WD controller computes the preset number of revolutions N1, which is expressed as:

$$N1 = K5 \times A \quad (13)$$

where: K5 is the constant

After box S1230, the control logic goes to box S1060 (see FIG. 13).

As mentioned before, powertrain play tends to become large due to wear of the powertrain components including the clutch 12. The computation in boxes S1220 and S1230 is designed to increase the preset number of revolutions N1 taking into account the progress of wear. The preset number of revolutions N1 increases gradually with the accumulated number of repetitions of PPE. Empirically, it is confirmed that the accumulated number of executions of PPE grows with the accumulated number of repetitions of 4WD operation. Thus, it may be safely said that the preset number of revolutions N1 increases with the accumulated number of repetitions of 4WD operation.

Figure 18:
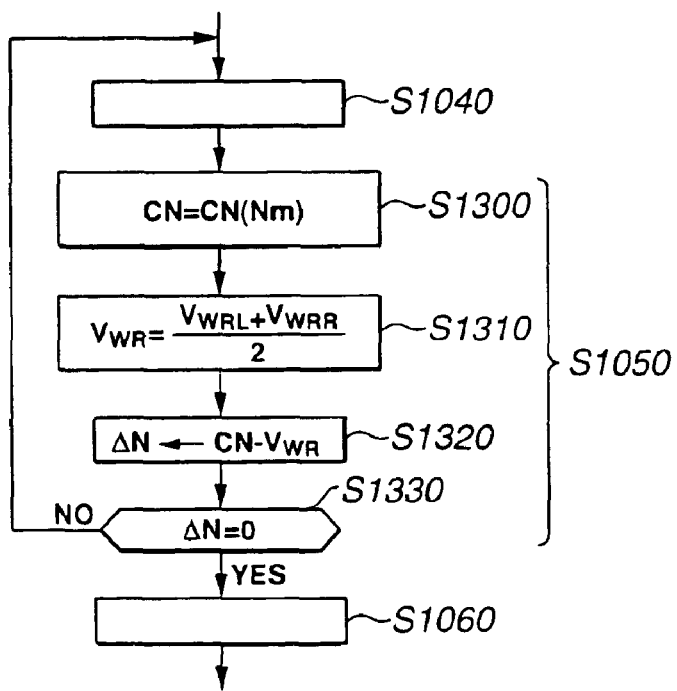
FIG. 18 is the portion of a flow diagram, which illustrates another example of end condition for PPE.

The fragmentary flow diagram in FIG. 18 illustrates another example of logic to determine whether or not the end-condition for PPE is met.

In box S1310, the 4WD controller determines a converted revolution speed CN by multiplying motor speed Nm with gear ratios of the reduction gearing 11 and the differential 13. In box S1310, the 4WD controller computes the averaged rear wheel speed $V_{WR}$. In the next box S1320, the 4WD controller computes a deviation ΔN, which is expressed as:

$$\Delta N = CN - V_{WR} \quad (14)$$

In the next box S5330, the 4WD controller determines whether or not the deviation ΔN is zero. If this is the case, the control logic goes to box S1060 (see FIG. 13) because the end-condition has been met. If this is not the case, the control logic returns to box S1040 (see FIG. 13). The computation in box S1330 may be modified taking into consideration of error in arithmetic operation. In this case, the deviation ΔN is compared to a predetermined value ΔN1 to find whether or not the former is greater than or equal to the latter.

Figure 19:
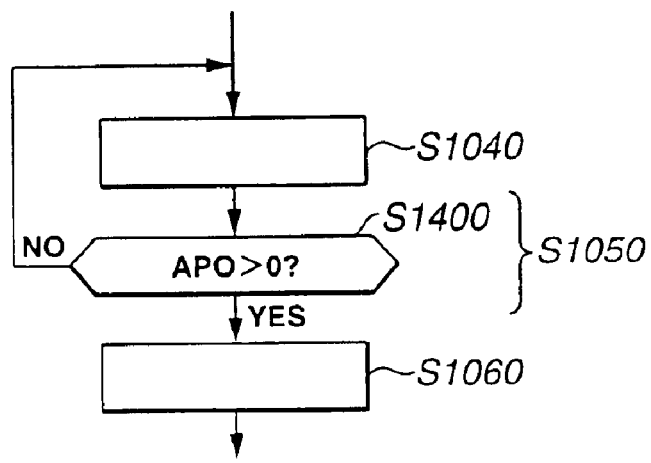
FIG. 19 is the portion of a flow diagram, which illustrates another example of end condition for PPE.

The fragmentary flow diagram in FIG. 19 illustrates another example of logic to determine whether or not the end-condition for PPE is met.

In box S1400, the 4WD controller determines whether or not the accelerator pedal 17 is depressed by comparing APO to a predetermined value of 0% or 5%. If this is the case, the control logic goes to box S1060 (see FIG. 13) because the end-condition for PPE has been met. If this is not the case, the control logic returns to box S1040 (see FIG. 13).

From the preceding description on the flow diagrams in FIGS. 16 and 17, it is understood that the preset period of time T1 and the preset number of revolutions N1 are variable with an estimate of the amount of powertrain play. Thus, they may be regarded as predictors providing the estimate of the amount of powertrain play.

As discussed in the preceding description, the electric power is applied to the electric motor 4, causing it to turn to eliminate powertrain play. In the exemplary implementation of the present invention, the flow diagram in FIG. 13 (see block S1040) clearly teaches keeping the electric power applied to the electric motor 4 constant to cause it to produce sufficiently low motor torque during eliminating powertrain play and upon and after completion of the powertrain play. As discussed before, the induction voltage E of the electric motor 4 increases as the motor speed Nm increases, causing the armature current Ia to decrease. As the armature current Ia determines the motor torque Tm, keeping the electric power input constant holds the motor torque Tm low when the electric motor 4 turns for PPE. Holding the motor torque Tm low suppresses shocks upon completion of PPE. Keeping the electric power sufficiently low suppresses shocks occurring upon completion of PPE to a satisfactorily low level.

The following description concerns the technique of keeping electric power constant during motor torque control for PPE.

In the exemplary implementation of the present invention, the generator command c1 (in the form of PWM signal) determines generator field current Ifh, which in turn determines the generated voltage of the generator 7. Thus, controllably regulating the generated voltage can adjust torque and speed of the motor 4.

Adjusting the applied voltage to a desired voltage value can adjust revolution speed of the electric motor 4 to a desired motor speed value. As is well known, the armature current Ia of the electric motor 4 determines the motor torque. The motor torque is proportional to the armature current Ia.

The implementation of the present invention has adopted a predetermined setting that the generated voltage determined by the generator command c1 allows the flow of armature current Ia to cause the electric motor 4 to produce motor torque sufficiently low enough to suppress shocks upon completion of PPE.

Figure 20:
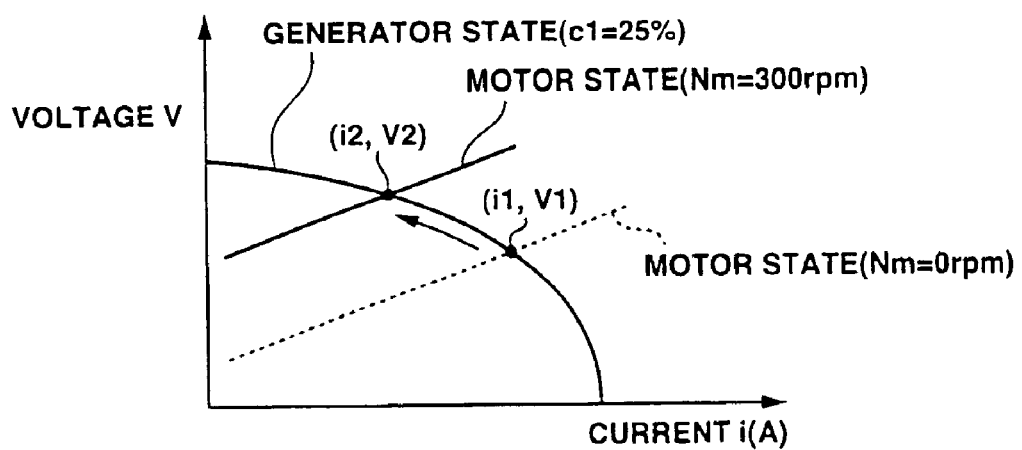
FIG. 20 is a graphical illustration of motor control by keeping electric power constant

The fully drawn curve in FIG. 20 illustrates an equal power line of the generator 7 with the generator command c1 kept constant (c1=25%)), and two motor characteristic lines, one indicating motor state at Nm=0 rpm, the other indicating motor state at Nm=300 rpm. The motor characteristic line indicating the motor state at Nm=0 rpm and the equal power line intersect to form an operation point (i1, V1) at which the electric motor 4 is about to turn to start PPE. Subsequently, the electric motor 4 turns as armature current Ia flows. As the electric motor 4 turns, the induced voltage E appears. Accordingly, the operation point moves on the equal power line in a direction lowering the flow of current and elevating the voltage and rests on an operation point (i2, V1). With such low motor torque, the electric motor 4 turns to eliminate powertrain play. This effectively suppresses shocks upon completion of PPE.

Referring to FIGS. 21A to 21E, the above-mentioned motor control for PPE is explained. FIG. 21A illustrates varying of motor speed Nm with time. FIG. 21B illustrates varying of induced voltage E with time. FIG. 21C illustrates varying of armature current Ia with time. FIG. 21D illustrates varying of generator command c1 with time. FIG. 21E illustrates varying of motor field current Ifm with time. With the generator command c1 kept at 25%, the generator 7 keeps electric power supplied to the electric motor 4 constant. This keeps the product E×Ia constant. FIGS. 21A, 21B and 21C illustrate that as the motor 4 turns, the voltage E increases and the current Ia drops to keep the product constant. The drop in the current Ia causes the motor torque Tm to drop. Thus, the motor speed remains constant. At constant speed and with low torque, the motor 4 eliminates powertrain play until the play becomes zero. Upon and immediately after completion of PPE, the voltage E drops and the current Ia increases.

As explained before in connection with box S1040 in FIG. 13, it is recommended to reduce the generator command c1 as the engine speed Ne increases as illustrated in FIG. 14 or 15 for restraining an increase in motor torque to suppress shocks upon completion of PPE.

With reference to FIG. 22, let us now consider varying of the generated output of the generator 7 with different values of engine speed Ne when the generator command c1 is unaltered. In FIG. 22, the fully drawn curve illustrates an equal power line of the generator 7 at engine speed Ne=650 rpm with the generator command c1 kept constant (c1= 25%), and two motor characteristic lines, one indicating motor state at Nm=0 rpm, the other indicating motor state at NM=300 rpm. In FIG. 22, the broken line curve illustrates another equal power line of the generator 7 at engine speed Ne=1500 rpm with the generator command c1 kept constant (c1=25%). The motor characteristic line indicating the motor state at Nm=0 rpm and the equal power lines intersect to form two operation points that have values i0 and i1 of current, respectively. The motor characteristic line indicating the motor state at Nm=300 rpm and the equal power lines intersect to form two operation points that have values i1 and i2 of current, respectively. These two operation points clearly show that an increase in engine speed Ne causes an increase in motor torque upon completion of PPE because i1>i2. The preceding description on FIG. 22 clearly supports the validity of correcting generator command c1 as illustrated in FIGS. 14 and 15.

As explained before in connection with FIG. 1, the clutch 12 is equipped with a cam-actuated pilot clutch that serves as a self-lock mechanism. This self-lock mechanism is effective to maintain powertrain play closed immediately after the electric motor 4 has turned to eliminate the play. Thus, continuous supply of electric energy to the electric motor 4 after completion of PPE is no longer needed, thus saving energy consumption.

If a clutch 12 is not equipped with the above-mentioned self-lock mechanism, continuous supply of electric energy to the electric motor 4 is one of various measures to keep powertrain play closed immediately after the electric motor 4 has turned to eliminate the play. In this case, electric current has to be low enough to keep the motor 4 in operation for generation of small torque with acceptable level of heat generation. This state may continue until the subsequent beginning of 4WD.

Referring to FIGS. 23A to 23E, the time charts illustrate scenario of PPE when the end-condition (T1) as illustrated in FIG. 16 is used in the flow diagram in FIG. 13, and the subsequent shift into 4WD without any considerable delay.

Referring to FIGS. 23A–23B, and 23D–23F, the time charts illustrate scenario of PPE when the end-condition (N1) as illustrated in FIG. 17 is used in the flow diagram in FIG. 13, and the subsequent shift into 4WD without any considerable delay.

Referring to FIGS. 24A to 24D, the time charts illustrate scenario of PPE when the end-condition ($\Delta N$) as illustrated in FIG. 18 is used in the flow diagram in FIG. 13, and the subsequent shift into 4WD without any delay.

It is remembered that fragmentary flow diagrams in FIGS. 16 to 19 illustrate four examples of logic to determine whether or not the end-condition for PPE is met.

Figure 25:
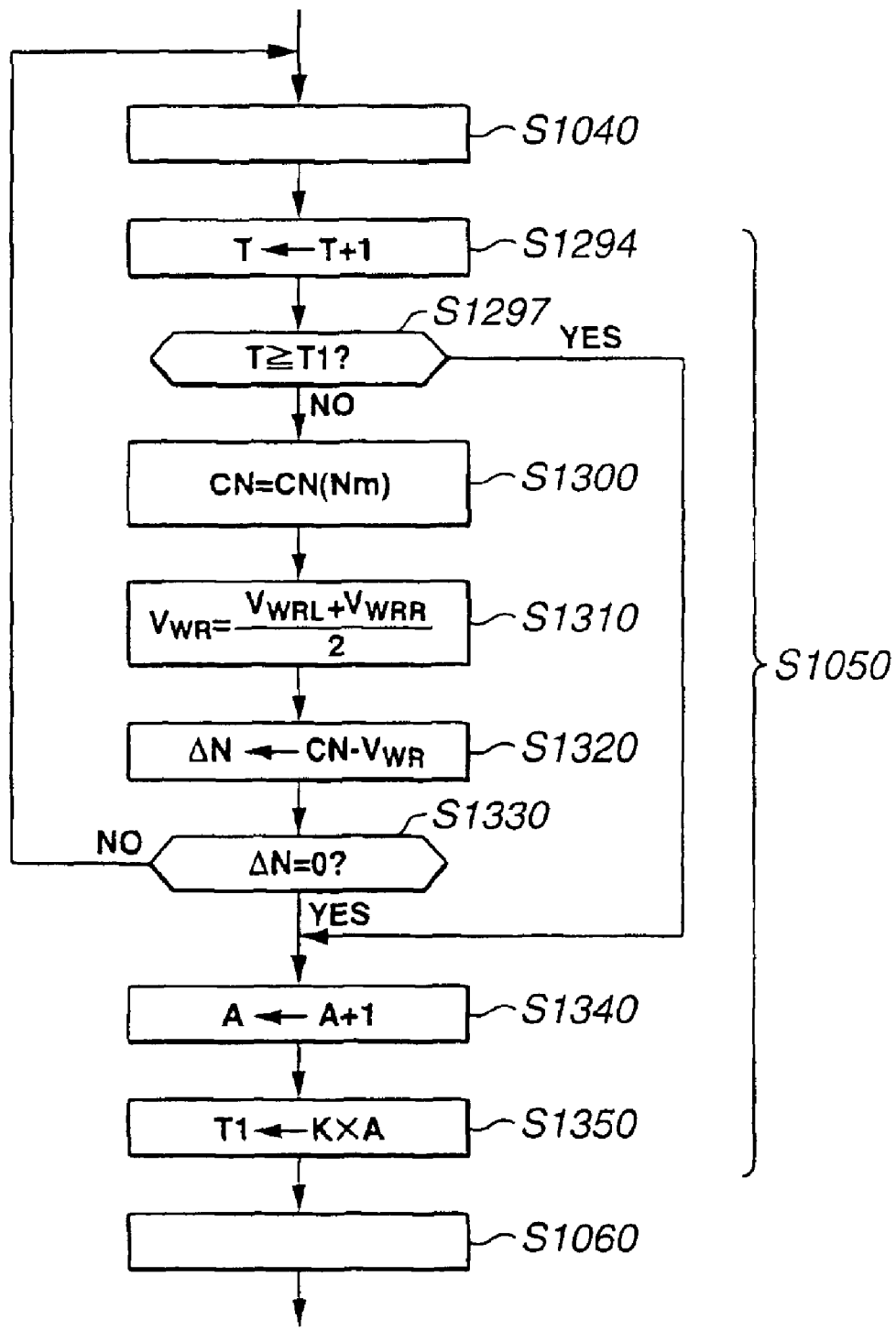
FIG. 25 is the portion of a flow diagram, which illustrates another example of end-condition for PPE.
Figure 26:
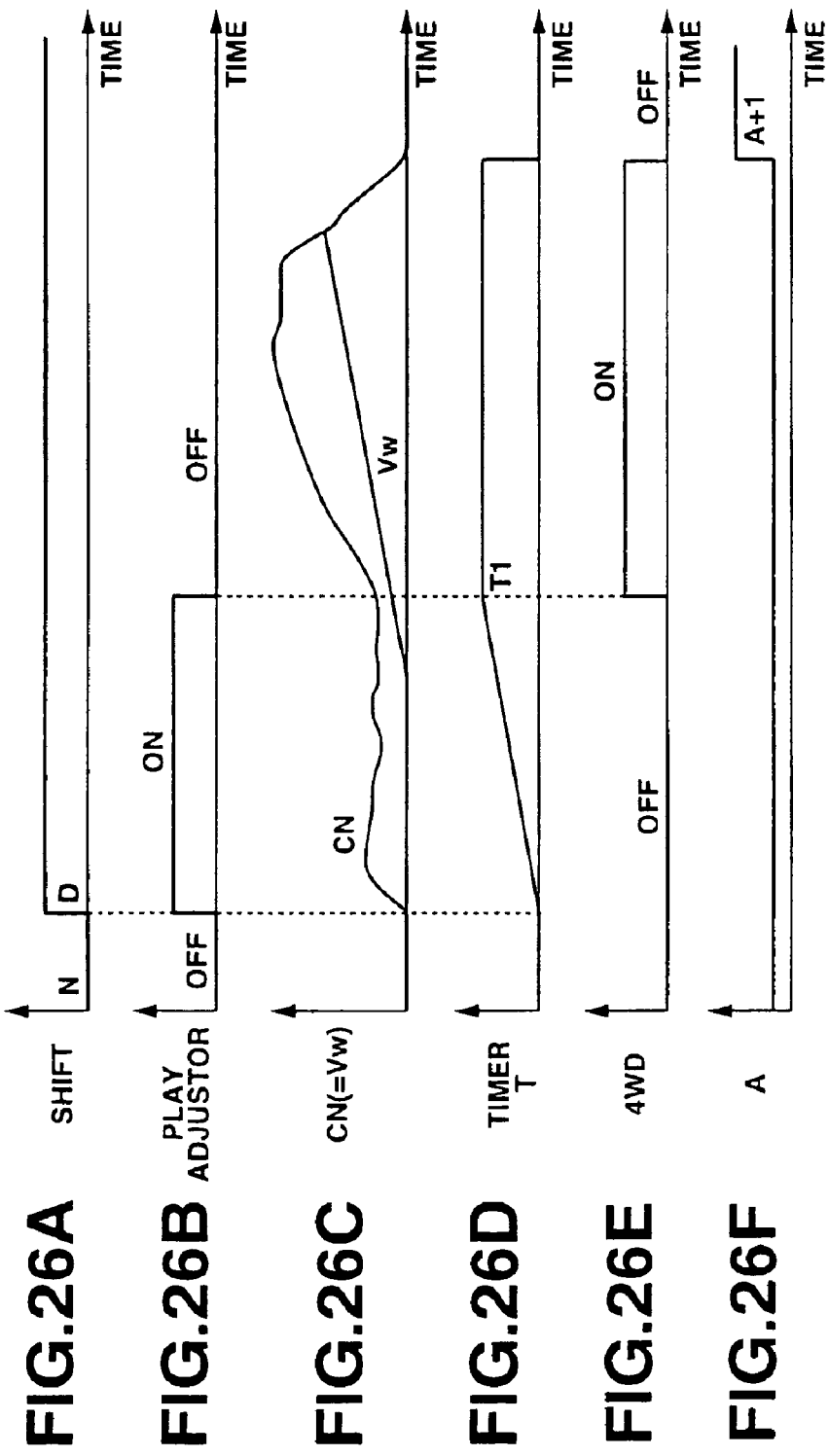
FIGS. 26A to 26F are timing charts for the flow diagram in FIG. 25.

The fragmentary flow diagram in FIG. 25 illustrates a modification to the example illustrated in FIG. 18. Time charts in FIGS. 26A to 26F illustrate scenario of PPE when the end-condition ($\Delta N$ or T1) as illustrated in FIG. 25 is used in the flow diagram in FIG. 13, and the subsequent shift into 4WD without any delay.

The logic in FIG. 25 is substantially the same as the logic in FIG. 18 except the incorporation of the logic in FIG. 16. The logic in FIG. 16 is incorporated in parallel relationship to the logic in FIG. 18. Newly added are boxes S1294, S1297, S1340 and S1350 to implement the logic in FIG. 16.

In box S1294, the 4WD controller counts up timer T by one. In the next box S1297, the 4WD controller determines whether or not the timer T is greater than or equal to a preset period of time T1. If, in box S1297, the timer T is less than the preset period of time T1, the control logic goes to box S1300. If, in box S1297, the timer T is greater than or equal to the preset period of time T1, the control logic goes to box S1340 because the end-condition for PPE has been met.

In box S1340, the 4WD controller counts up a starting frequency counter A by one. In the next box S1350, the 4WD controller computes the preset period of time T1, which is expressed by the equation (12). After box S1350, the control logic goes to box S1060 (see FIG. 13).

The illustrated scenario in FIGS. 26A to 26F tells the deviation $\Delta V$ fail to become zero when the timer T becomes greater than the preset period of time T1.

With reference back to FIG. 13 and also to FIG. 27, it will be explained how to modify the control diagram in FIG. 13 to implement another round of PPE. Preferably, another round of PPE is carried out after operator depression of the accelerator pedal 17 before acceleration slip $\Delta VF$ becomes great enough for shift into 4WD by, for example, incorporating between boxes S1060 and S1070 boxes as illustrated by the fragmentary block diagram in FIG. 27. In this case, the 4WD controller can suspend supply of electric power to the electric motor 4 immediately after end-condition in box S1050 has been met. Subsequently, operator depressing the accelerator pedal 17 causes the 4WD controller to resume supply of electric power for another round of PPE prior to shift into 4WD. This control strategy is effective to save energy consumption with shock less shift to 4WD.

Figure 28A:
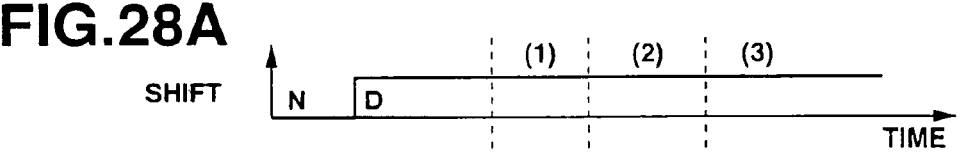
FIGS. 28A to 28E are timing charts for the flow diagram in FIG. 27
Figure 28B:
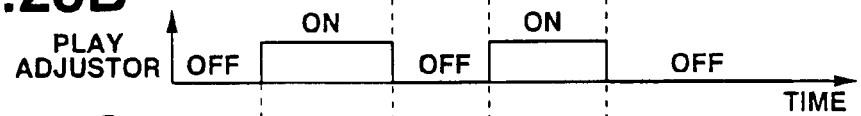
Figure 28C:
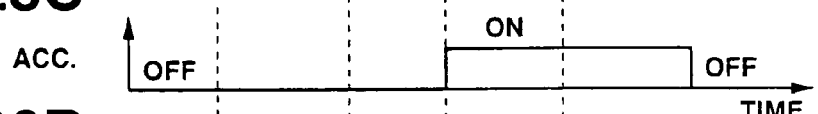
Figure 28D:
Figure 28E:
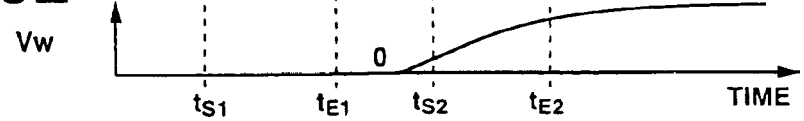
Figure 29A:
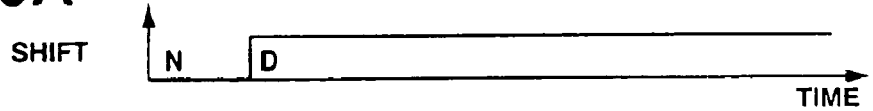
FIGS. 29A to 29E are timing charts for the flow diagram in FIG. 27.
Figure 29B:
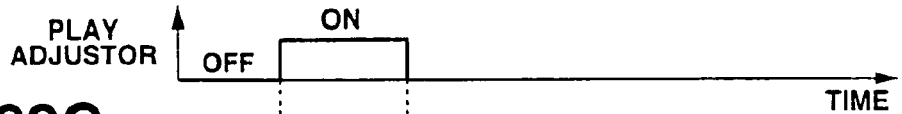
Figure 29C:
Figure 29D:
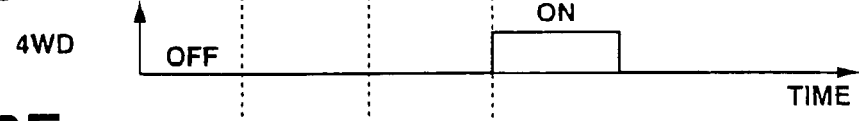
Figure 29E:
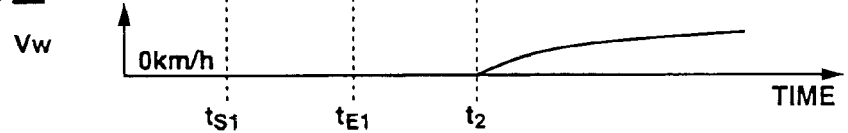

Referring to FIGS. 28A to 28E, the time charts illustrate scenario of another round of PPE immediately before shift into 4WD when the flow diagram in FIG. 13 as modified above end-condition is used. One round of PPE is carried out immediately after operator shift into D (Drive) at the moment $t_{S1}$. Immediately after completion of this PPE at the moment $t_{E1}$, 4WD controller interrupts supply of electric power to the electric motor 4. The interruption of supply of electric power continues immediately before the moment $t_{S2}$. At the moment $t_{S2}$ when the operator steps on the accelerator pedal 17, the 4WD controller resumes the supply of electric power to the electric motor 4, causing the motor to turn for another round of PPE. At the subsequent moment $t_{E2}$, the acceleration slip $\Delta VF$ has become great enough for shift into 4WD, another round of PPE ands and shift into 4WD mode starts. As shown in FIG. 28E, the wheel speed $V_W$ increase immediately before the moment $t_{S2}$, As seen from FIGS. 28B and 28E, another round of PPE takes place when the vehicle is moving.

With regard to the timing to start another round of PPE, another round of PPE may begin immediately after the wheel speed has become greater than zero or immediately after determination of appearance of longitudinal vehicle G. Another measure is to monitor the motor speed sensor 26 with the clutch 12 left engaged after completion of the initial round of PPE. In this case, another round of PPE is initiated upon detection of revolution speed signal, Monitoring induced voltage E of the electric motor 12 is another measure. In this case, another round of PPE is initiated upon detection of appearance of induced voltage E.

Let us now consider the case when the vehicle has started moving without any operator stepping on the accelerator pedal. This case involves creep running of a motor vehicle with an automatic transmission and inertia running of a motor vehicle with a manual transmission upon moving down a slope. In this case, it is preferred that another round of PPE is delayed until subsequently the operator steps on the accelerator pedal. The 4WD controller may recognize the above-mentioned case upon detecting appearance of vehicle speed signal when the accelerator pedal is released.

Le us now consider the quality of shift into 4WD in one scenario from standstill and in another scenario from creep running.

With reference to FIGS. 29A to 29E, in one scenario, the powertrain play is always eliminated before prior to moving from standstill. As another round of PPE is not needed, the 4WD controller can provide a smooth and quick shift into 4WD, thus providing an enhanced acceleration without any wheel slip.

With reference to FIGS. 28A to 28E, in another scenario, operator stepping on the accelerator pedal initiates another round of PPE before making a shift into 4WD. This provides shock less shift into 4WD. As the motor vehicle has started moving upon stepping on the accelerator pedal, a delay due to another round of PPE does not pose any problem. This is because demand on quick shift into 4WD upon starting the vehicle from creep running state is appreciably less than the same demand upon starting the vehicle from standstill.

Figure 27:
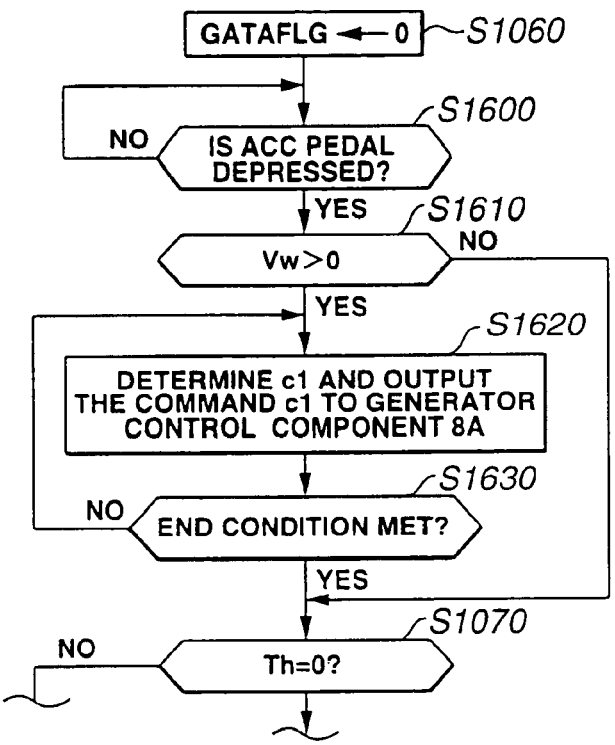
FIG. 27 is the portion of a flow diagram, which illustrates a modification of the control routine in FIG. 13.

The fragmentary flow diagram in FIG. 27 can provide the above-mentioned two scenarios.

As mentioned before, the flow diagram in FIG. 13 as modified by the fragmentary flow diagram in FIG. 27 becomes a complete flow diagram.

After box S1060, the control logic goes to box S1600. In box S1600 of FIG. 27, the 4WD controller determines whether or not the accelerator pedal 17 is depressed. If this is not the case, the control logic waits until the accelerator pedal 17 will be subsequently depressed. If this is the case, the control logic goes to box S1610.

In box S1610, the 4WD controller determines whether or not the vehicle is moving. If this is the case, the control logic goes to box S1620 for conducting another round of PPE until end-condition will be met in box S1620, In this case, a shift into 4WD begins immediately after the end-condition has been met in box S1630. FIGS. 28A to 28E clearly illustrate this case.

If, in box S1610, the 4WD controller determines that the motor vehicle is not moving, the control logic goes to box S1070 (see FIG. 13) without conducting another round of PPE. In this case, a shift into 4WD begins immediately after the vehicle operator has stepped on the accelerator pedal. FIGS. 29A to 29E clearly illustrate this case.

With reference back to the flow diagram in FIG. 27, the 4WD controller may determine whether or not the averaged wheel speed $V_W$ is greater than zero in determining whether or not the motor vehicle is moving (see box S1610). Monitoring a vehicle longitudinal G sensor is another measure to make this determination. Monitoring all of four wheel speed sensors 27FL, 27FR, 27RL and 27RR is another measure to make this determination. In this case, the 4WD controller may determine that the vehicle is moving upon finding motion of the first one of the four road wheels. This provides the quickest determination that the vehicle is moving with the least response delay. In another case, the 4WD controller may determine that the vehicle is moving upon finding that motion of each road wheel This provides the safest and reliable determination that the vehicle is moving. The 4WD controller may monitor wheel speed sensor(s) of ABS (anti-brake system) of the latter is provided.

If the conventional rotary sensor is not satisfactory in providing speed information of a road wheel at very low speeds, the use of a high reduction gearing is preferred.

As previously described, the 4WD controller keeps the electric power applied to the electric motor 4 constant during operation for PPE. The present invention is operational with other motor control strategy to keep the motor torque as low as possible to suppress shock upon completion of PPE. For example, the 4WD controller may controllably adjust generator command c1 to adjust the generated voltage applied to the electric motor 4 to keep it operating at a desired revolution speed. Under this control the motor 4 rotates with very small motor torque. This motor control strategy, called "motor speed control," is another strategy for controlling the motor 4 PPE.

Figure 30A:
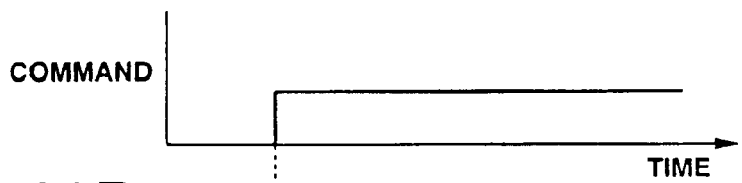
FIGS. 30A and 30B are timing charts illustrating varying of motor revolution speed (Nm) when a motor command maintains armature current invariable.
Figure 30B:
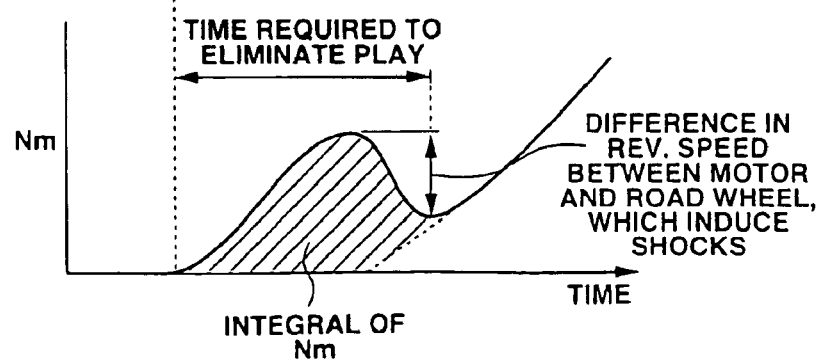

Another motor control strategy, called "motor torque control," is known. With reference to FIGS. 30A and 30B, this section provides brief description of motor torque control. FIG. 30A shows a motor torque command, At the moment upon or immediately after a shift into 4WD has been demanded, the motor torque command appears and continue to stay unaltered. In FIG. 30B, the fully drawn curve illustrated varying of motor speed Nm of the motor 4 with time, and the broken line illustrates varying of wheel speed of rear road wheels 3L, 3R with time. In this case, the motor control for PPE is not carried out. Initially, during period of time required for elimination of powertrain play, the motor speed Nm only increases with rear road wheels at rest. Upon completion of elimination of powertrain pulley, the engagement with the rear road wheels with a considerable difference in revolution speed induces shocks. In FIG. 30B, the shadowed portion indicates integral of motor revolution speed Nm.

Figure 31A:
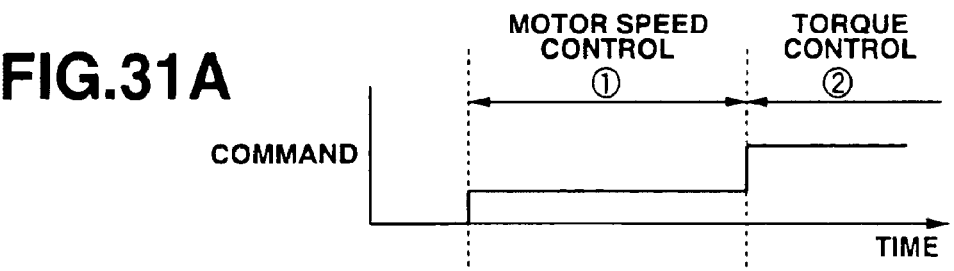
FIGS. 31A and 31B are timing charts illustrating varying of motor revolution speed (Nm) when a motor command provides reduced armature current for motor speed control until powertrain play is eliminated.
Figure 31B:
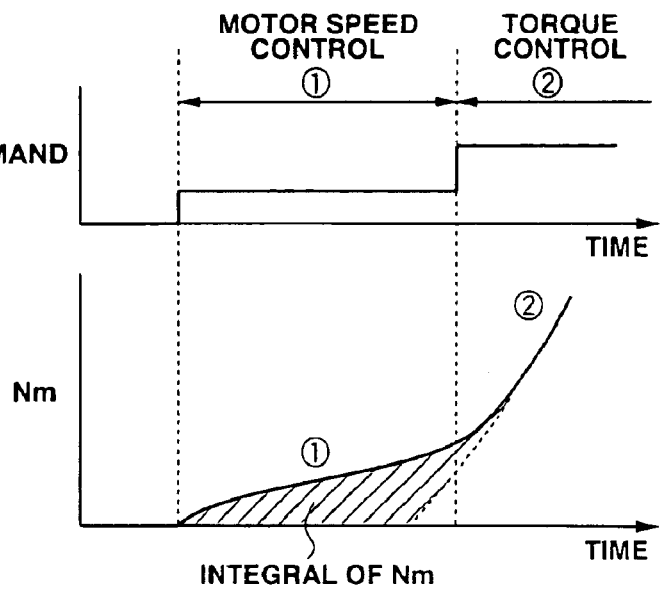

With reference to FIGS. 31A and 31B, this section provides description on a motor control for PPE and subsequent shift into 4WD according to one exemplary implementation of the present invention. The clutch 12 has been engaged. Under motor speed control, the electric motor 4 is regulated to rotate at very low revolution speed for elimination of powertrain play as shown at region 1 in FIGS. 31A and 31B. Subsequently, immediately prior to the completion of elimination of powertrain play, the electric motor 4 is regulated under torque control as shown at region 2 in FIGS. 31A and 31B. In this example, after powertrain play has been eliminated by operation of the electric motor 4 at very low revolution speed, the torque control is used to regulate the electric motor 4. As the powertrain play is eliminated by slow rotation of the electric motor, any considerable shock during and upon engagement of elimination of powertrain play. After the powertrain play has been closed, the electric motor 4 is free from rotational variation during making a shift into 4WD, thus providing smooth acceleration in synchronous with revolution speed of the rear road wheels 3L, 3R.

Figure 32:
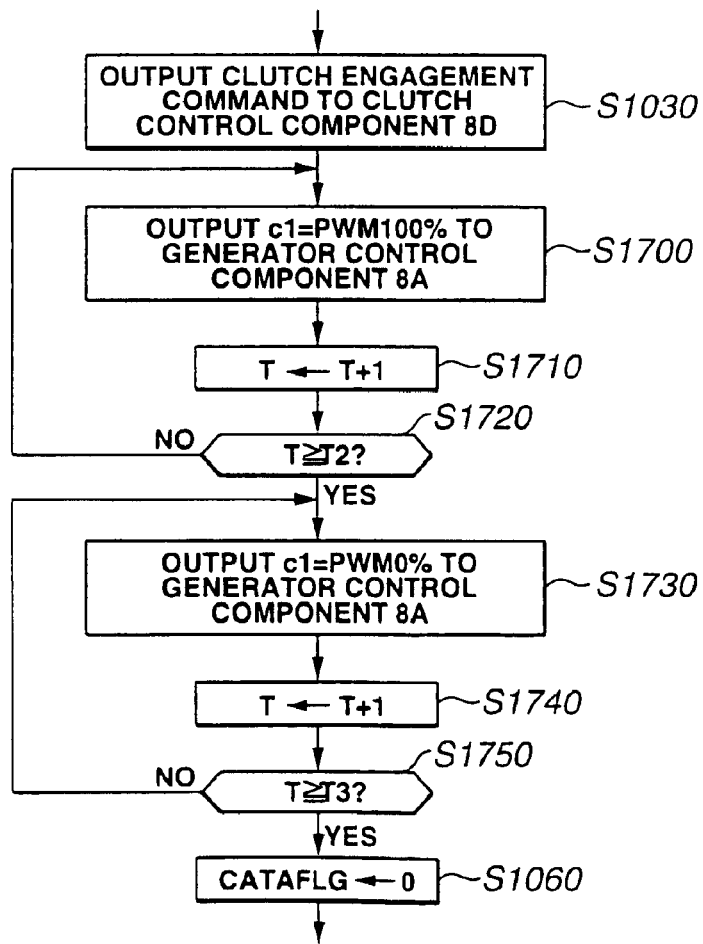
FIG. 32 is the portion of a flow diagram, which illustrates a modification of the flow diagram in FIG. 13.

With reference to FIG. 32, another exemplary implementation according to the present invention is described. The fragmentary flow diagram in FIG. 32 illustrates motor control for PPE (powertrain play elimination), which should replace two boxes S1040 and S1050 shown in FIG. 13, Specifically describing, this implementation is substantially the same as the previously described implementation illustrated in FIG. 13. However, this implementation is different from the previously described implementation in the insertion of boxes S1700, S1710, S1720, S1730, S1740 and S1750 between the boxes S1030 and S1060 in the place of the two boxes S1040 and S1050.

In box S1030, the 4WD controller outputs a clutch engagement command to the clutch control component 8D. The control logic goes to box S1700.

In box S1700, the 4WD controller sets 100% as generator command c1 and outputs the generator command c1 to generator control component 8A.

In the next box S1710, the 4WD controller counts up timer T by one.

In the next box S1720, the 4WD controller determines whether or not the timer T is greater than or equal to a preset period of time T2. The setting is such that this preset period of time T2 is shorter than an estimated period of time that is required for PPE.

With its full power, the generator 7 generates power applied to the electric motor 4 over the preset period of time T2, causing the motor 4 to rapidly rotate.

Immediately after lapse of the preset period of time T2, the control logic goes to box S1730. In box S1730, the 4WD controller sets 0% as generator command c1 and outputs the generator command to generator control component 8A.

In the next box S1740, the 4WD controller counts up timer T by one.

In the next box S1750, the 4WD controller determines whether or not the timer T is greater than or equal to a preset period of time T3.

After lapse of the preset period of time T2, the 4WD controller interrupts the supply of power to the electric motor 4 over the preset period of time T3, causing the motor 4 to rotate by inertia.

Immediately after lapse of the preset period of time T3, the control logic goes to box S1060 (see FIG. 13).

In box S1730, in the place of setting 0%, lowering the generator command c1 considerably is a modification in order to cause the electric motor 4 to rotate by inertia.

Subsequently, the 4WD controller may gradually increase the generator command c1 from 0% to 100% to provide a smooth acceleration during shift into 4WD.

With the above-mentioned control strategy, the electric motor 4 can eliminate powertrain play quickly. This control strategy involves rapidly rotating t0068e motor in the initial stage by outputting relatively high generator command c1 and suspending supply of power to the electric motor 4 once the rotor has begun rotating to let the inertia to keep the motor 4 rotating to eliminate powertrain play.

The time charts in FIGS. 33A, 33B and 33C illustrate operation of the motor control according to the implementation of the present invention. As illustrated in FIG. 33B, initially the rate of change in motor speed Nm increases. Subsequently, suspending the generator command c1 causes the inertia to keep the motor constant, As the power generation has ceased, there is no current passing through the electric motor 4, causing no motor torque to appear. The inertia alone keeps the electric motor 4 rotating. No motor torque exists so that shock upon completion of PPE is small. After completion of PPE, quickly increasing the power generation capability may be allowed to produce motor torque for shift into 4WD. Such quick increase will not cause any shock because the powertrain play has been eliminated, However, such quick increase is discouraged because gradually increasing the power generation capability provides favorable acceleration G as acceleration feel with 4WD.

The motor control according to the implementation of the present invention has shortened time required for PPE. Thus, this motor control is applicable to PPE carried out prior to shift into 4WD when the accelerator pedal is depressed. In this case, the generated power may be adjusted in response to APO (accelerator pedal opening) such that, as APO increases, the generated power increases to reduce time required for inertia rotation. This is because increasing APO may be regarded as operator demand for advancing timing with which the shift into 4WD should start.

In the previous description, the generator command c1 is altered with engine speed Ne as shown in FIG. 15 to keep the generated power constant against variation in engine speed. The present invention is not limited to this manner of altering the generator command c1.

The generator command c1 is increased by a correction factor c2 that varies with different values of APO. That is, the generator command c1 is corrected versus variations in vehicle acceleration. Finding an appropriate value of the correction factor c2 in a look-up map as shown in FIG. 34, a generator command c1 is given by the following formula:

$$c1=c0+c2 \qquad (15)$$

where: c0 is the base. In this embodiment, the base c0 is a fixed value of 25% (c0=25%).

In another embodiment, the base c0 is determined as a function, which is similar to the illustrated function in FIG. 15, of engine speed Ne.

In another embodiment, the base c0 is determined as a function of engine speed Ne as shown in FIG. 35. In this embodiment, the base c0 is inversely proportional to engine speed Ne. With reference to FIGS. 36A to 36D, the generator command c1 varies against time as shown in FIG. 36D when the engine speed Ne and the accelerator opening APO vary with time as shown in FIGS. 36C and 36B, respectively. FIG. 36A shows varying of motor speed Nm with time.

When the vehicle is at standstill, the accelerator pedal 17 is released and the engine 2 idles at 650 rpm as shown in FIGS. 36B and 36C Under this condition, the generator command c1 is determined by the base c0 only. As mentioned above, the base c0 is inversely proportional to engine speed Ne as shown in FIG. 35. As the generated power due to the generator command c1 (=c0) is applied to the electric motor 4, the motor speed Nm initially increases and remains constant subsequently.

Subsequently, when the accelerator pedal 17 is deeply depressed to a value of $A_{CC2}$ as shown in FIG. 36B, the engine speed Ne increases. In response to the increase in engine speed Ne, the base c0 decreases as shown in FIG. 35 and finally becomes zero at the engine speed value of 1500 rpm. In response to the increase in APO, the correction factor c2 increases by a value determined by the increase in APO as shown in FIG. 34.

In this case, the start-condition for PPE is met when the accelerator pedal 17 is depressed. As the generator g1 is increased by the correction factor c2 that is proportional to the increase in APO, the generated power applied to the electric motor 4 increases to shorten time required to complete PPE.

Figure 37:
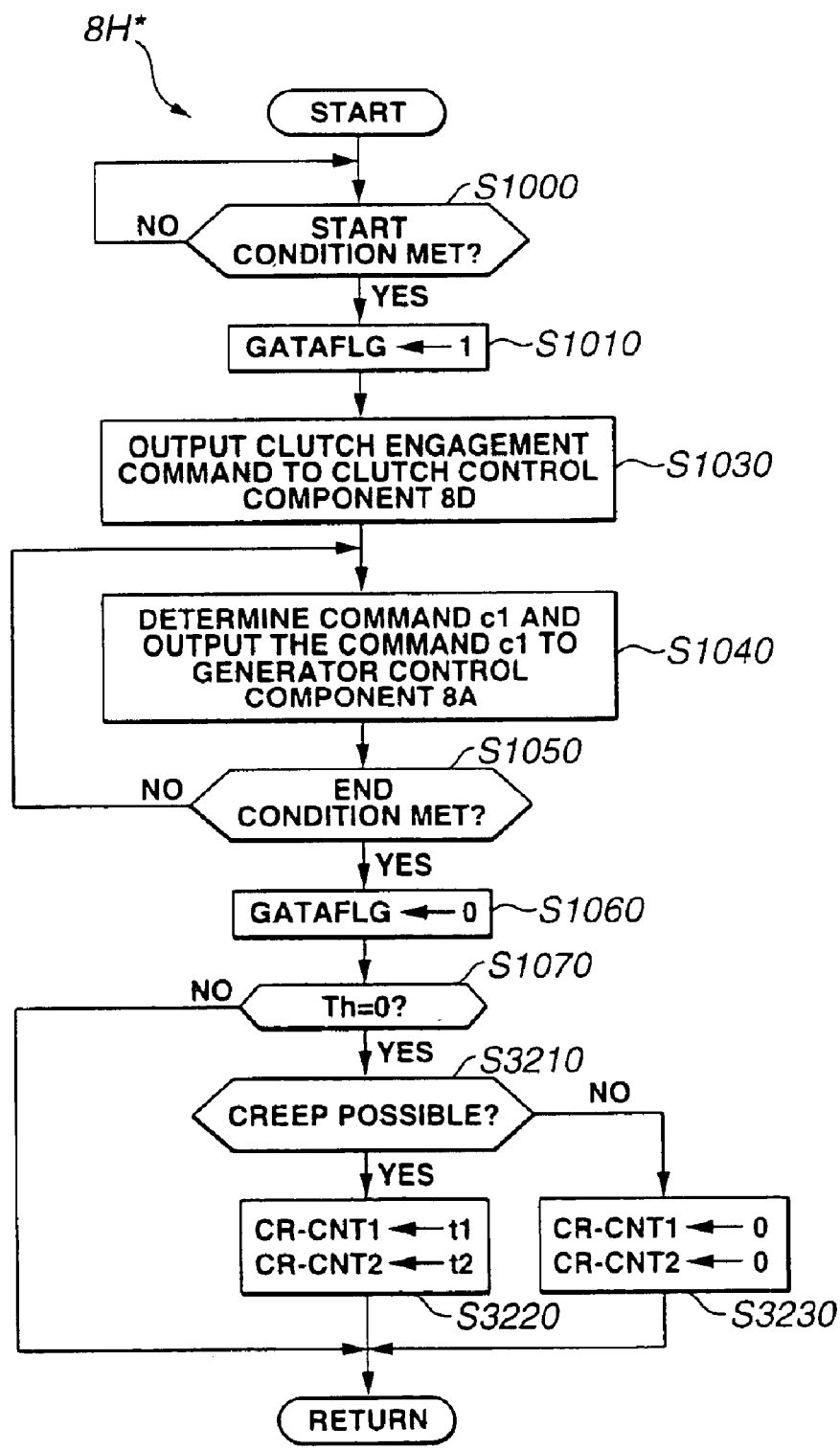
FIG. 37 is a flow diagram, similar to FIG. 13, of another control routine for powertrain play adjustor component (8H*) for eliminating powertrain play according to the present invention.
Figure 38:
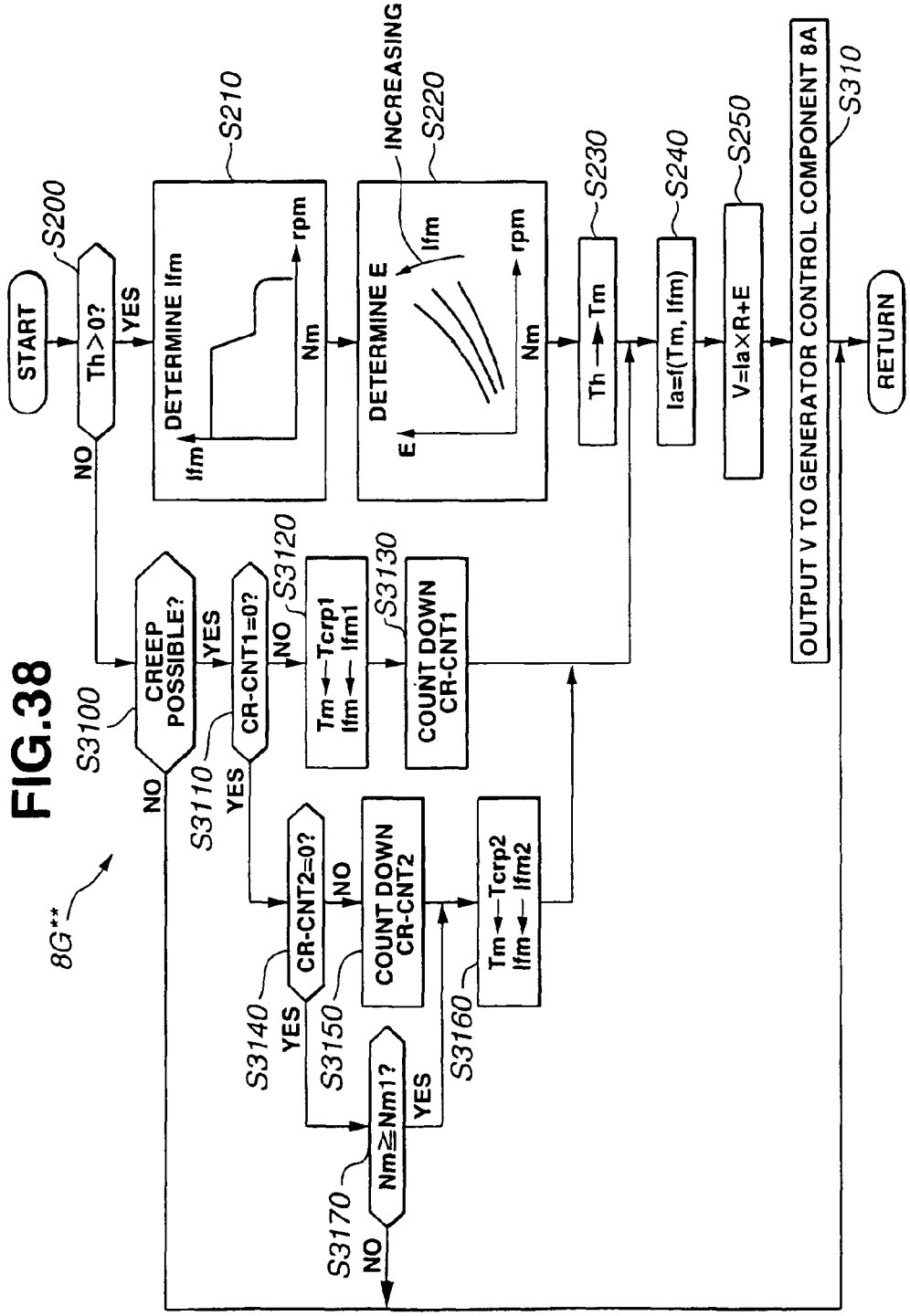
FIG. 38 is a flow diagram, similar to FIG. 12, of another control routine for desired generator voltage (V) calculating component (8G**) according to the present invention.
Figure 39:
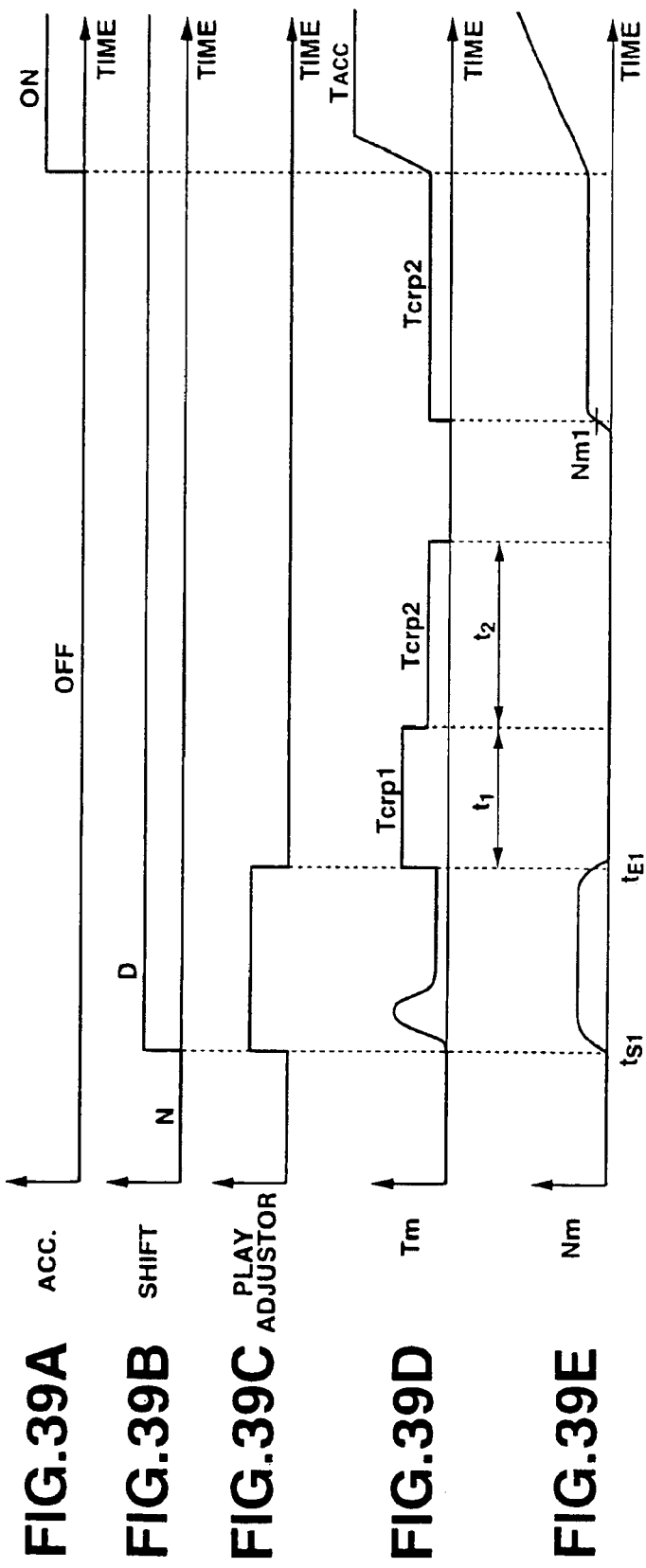
FIGS. 39A to 39E are timing charts illustrating powertrain play control after termination of powertrain play adjustment operation.

With reference to FIGS. 37 and 38, another exemplary implementation of the present invention will be described. This exemplary implementation is substantially the same as the previously described implementation of the present invention, which was described with reference to the flow diagrams in FIGS. 12 and 13. However, this implementation is different from the previously described implementation in play adjustor component 8H and also in desired generator voltage (V) calculating component 8G*.

In the play adjustor component 8H according to the previously described implementation, the flow diagram in FIG. 13 clearly tells that after completion of PPE (see box S1060), if the desired value of load torque Th is zero (see box S1070), the generator ceases power generation by making the generator command c1 zero (see box S1080). However, a play adjustor component now designated at 8H* (see FIG. 37) is different from the play adjustor component 8H (see FIG. 13) in that the electric motor 4 is regulated to produce creep torque if the desired value of load torque Th is zero (see box S1070) after completion of PPE (see box S1060). The creep torque is applied to the power train to keep the powertrain play closed.

The flow diagram of the play adjustor component 8H\* in FIG. 37 is substantially the same as the flow diagram of he play adjustor component 8H in FIG. 13 except the provision of new boxes S3210, S3220 and S3230 in the place of the b ox S1080.

If, in box S1070 of FIG. 37, the desired load torque Th is zero, the control logic goes to box S3210. This is the case where a shift to 4WD does not begin after completion of PPE.

In box S3210, the 4WD controller determines whether or not the motor vehicle may produce creep. If this is the case, the control logic goes to box S3220. If this is not the case, the control logic goes to box S3230.

The 4WD controller can determine that the vehicle may produce creep when the operator releases the accelerator pedal 17 with the operator shifting into any one of drive ranges (D, R, 1, 2).

Two counters CR-CNT1 and CR-CNT2 are provided to define periods of time for application of two different, in magnitude, torque.

In box S3220, the 4WD controller sets to and t2 to counters CR-CNT1 and CR-CNT2, respectively. Then, the control logic returns to the start point.

In box S3230, the 4WD controller clears the counters CR-CNT1 and CR-CNT2, respectively. Then, the control logic returns to the start point.

With reference to FIGS. 38 and 12, the desired generator voltage (V) calculating component, now designated at **8G\*\*, is substantially the same as the previously described desired generator voltage (V) calculating component 8G\*** except the provision of boxes S3100, S3110, S3120, S3130, S3140, S3150, S3160 and S3170.

What is done in these boxes is to determine the magnitude of creep torque and time schedule of applying the creep torque.

In FIG. 38, at box S200, the 4WD controller determines whether or not the desired value of load torque Th is greater than zero. If this is the case, the control logic goes to box S210. If this is not the case, the control logic goes to box S3100.

In box S3100, the 4WD controller determines whether or not the motor vehicle may produce creep. If this is the case, the control logic goes to box S3110. If this is not the case, the control logic returns to start point.

In box S3110, the 4WD controller determines whether or not the counter CR-CNT1 is cleared. If this is the case, the control logic goes to box S3140. If this is not the case, the control logic goes to box S3120.

In box S3120, the 4WD controller sets first creep torque Tcrp1 as a desired value of motor torque Tm and sets a first preset current value Ifm1 as the desired value of motor field current Ifm. In this example, the first preset current value Ifm1 is a PWM value of 30% of the maximum current value.

In the next box S3130, the 4WD controller counts down the counter CR-CNT1. Then, the control logic goes to box S240.

If, in box S3110, counter CR-CNT1 is not zero, the control logic goes to box S3140.

In box 3140, the 4WD controller determines whether or not the counter CR-CNT2 is cleared. If this is the case, the control logic goes to box S3170. If this is not the case, the control logic goes to box S3150.

In box S3150, the 4WD controller counts down the counter CR-CNT2. Then, the control logic goes to box S3160.

In box S3160, the 4WD controller sets second creep torque Tcrp2 as the desired value of motor torque Tm and sets a second preset current value Ifm2 as the desired value of motor field current Ifm. In this example, the second preset current value Ifm1 is a PWM value of 30% of the maximum current value. Then, the control logic goes to box S240.

In box S3170, the 4WD controller determines whether or not the motor speed Nm is greater than or equal to a predetermined motor speed value Nm1. If this is the case, the control logic goes to box S3160. If this is not the case, the control logic returns to the start point.

The first motor torque Tcrp1 is greater than the second creep torque Tcrp2 (Tcrp1>Tcrp2).

With reference to FIGS. 39A to 39E, the operation of this exemplary implementation is explained.

At the moment $t_{E1}$, upon completion of PPE, the electric motor 4 is caused to rotate with the relative strong first creep torque Tcrp1 for t1 seconds if a shift to 4WD has not begun and the motor vehicle may creep. Applying this relatively strong first creep torque Tcrp1 to the electric motor 4 firmly keeps the powertrain play closed. Subsequently, applying less strong second creep torque Tcrp2 for t2 seconds to keep powertrain play closed in anticipating future vehicle creep running. At a later moment, upon determining that the vehicle is creeping, the second creep torque Tcrp2 is applied to the electric motor 4. This is the moment when the motor speed Nm exceeds Nm1.

The above-mentioned operation is terminated when the accelerator pedal is later depressed.

Figure 40:
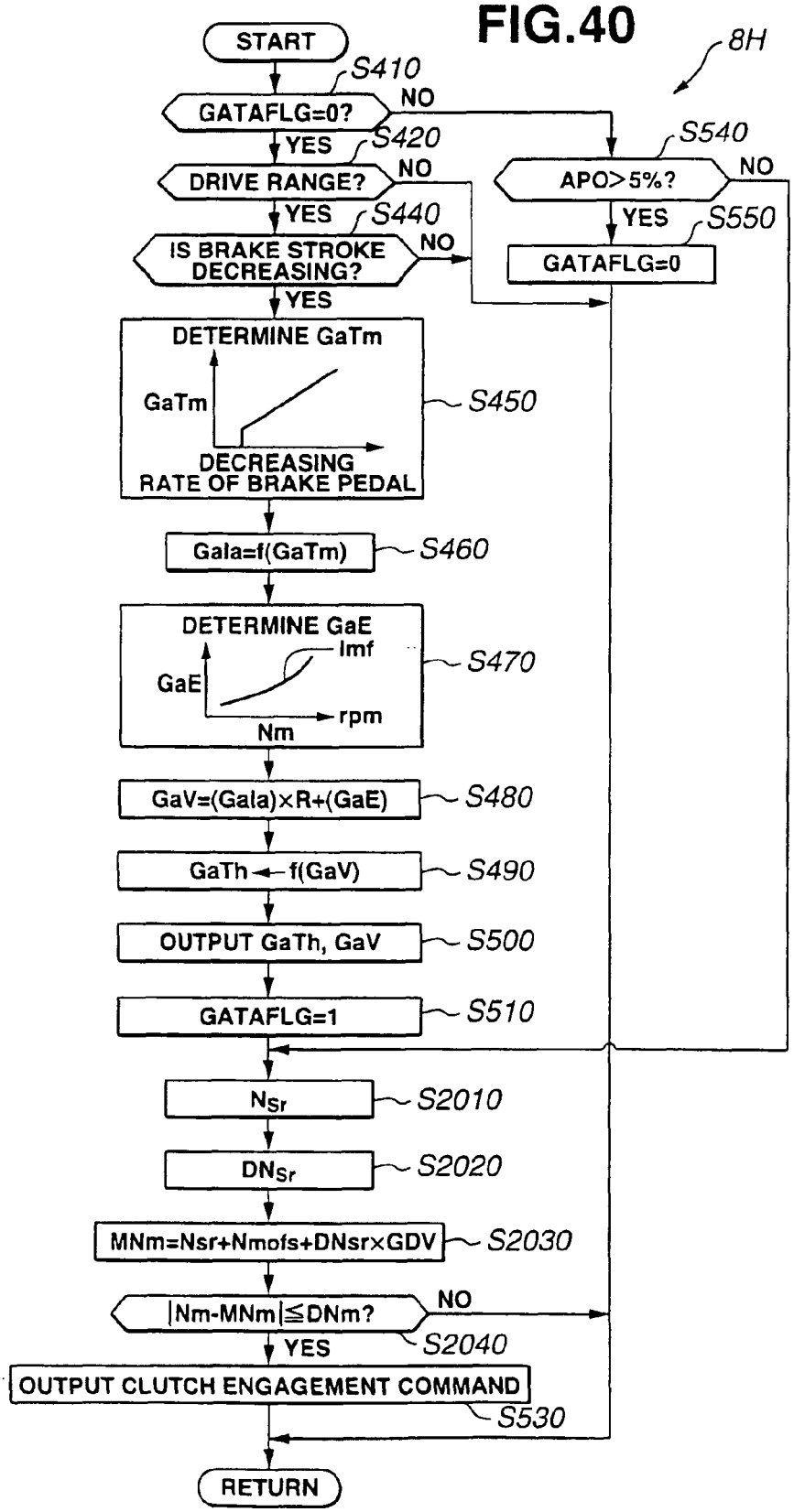
FIG. 40 is a flow diagram, similar to FIG. 8, of another control routine for powertrain play adjustor component (8H) for eliminating powertrain play according to the present invention.

With reference to FIG. 40, another exemplary implementation according to the present invention will be described. This exemplary implementation is substantially the same as the previously described implementation of the present invention, which was described with reference to the flow diagram in FIG. 8. However, this implementation is different from the previously described implementation in play adjustor component 8H.

In the play adjustor component 8H according to the previously described implementation, the flow diagram in FIG. 8 clearly tells that start-condition for PPE includes box S430. In FIG. 8, in box S550, the difference ΔVc between a clutch input shaft revolution speed and a clutch output shaft revolution speed is checked prior to outputting clutch engagement command in box S530.

In the flow diagram of the play adjustor component 8H in FIG. 40, start-condition for PPE does not include the box S430 (see FIG. 8).

The flow diagram of the play adjustor component 8H in FIG. 40 is substantially the same as the flow diagram of the play adjustor component 8H in FIG. 18 except the provision of new boxes S2010, S2020, S2030 and S2040 in the place of the box S520.

In FIG. 40, at box S2010, the 4WD controller determines a revolution speed Nsr of an output shaft of the clutch 12, Hereinafter, this revolution speed is abbreviated as a clutch output speed Nsr. If possible, the 4WD controller may monitor a rotary sensor on the output shaft of the clutch 12 to determine the clutch output speed Nsr. In this implementation, the 4WD controller monitors a rotary sensor on an axle of rear road wheels 3L, 3R. Using the sensor output indicative of revolution speed of the axle and the reciprocal of a gear ratio of the reduction gear 11, the 4WD controller computes the clutch output speed Nsr.

In the next box S2020, the 4WD controller computes the rate of a change in clutch output speed Nsr and set it as a clutch output acceleration DNsr.

In the next box S2030, the 4WD controller computes a desired value of motor speed MNm, which is expressed as:

$$MNm = Nsr + Nmofs + DNsr \times GDV \quad (6)$$

where:

Nmofs is the revolution speed difference;

GDV is the constant accounting for a delay in engagement of the clutch 12.

The revolution speed difference Nmofs is a value determined by tests. Accounting for torque variation that brings about shock determines this value. If the magnitude is small, shock due to torque variation will not be recognized because of the presence of powertrain play. The revolution speed difference Nmofs may be a variable that is inversely proportional to motor speed Nm of the electric motor 4 or clutch output speed Nsr of the clutch 12.

The above-mentioned GDV is a value for converting clutch output acceleration DNsr to a variation in estimate, which takes into account a response delay of the clutch 12. The product DNsr×GDV is a correction factor of the desired value of motor speed MNm accounting for a difference between a value of clutch output speed Nsr at the moment of determination and an actual value thereof at the moment upon engagement of the clutch 12.

In the next box S2040, the 4WD controller determines in whether or not the absolute value of difference between Nm and MNm is less than an allowable deviation DNm, which may be expressed as:

$$|MNm - Nm| \leq DNm \quad (17)$$

Motor rotary acceleration ΔNm of the electric motor 4 may be used to correct the allowable deviation DNm. The clutch response delay allows overshoot in motor speed Nm, which increases in response to motor rotary acceleration ΔNm. Accounting for such overshoot inevitably requires increasing the allowable deviation DNm in response to motor rotary acceleration ΔNm. In the formula (17), setting an increased value as DNm provides substantially the same result as setting a decreased value as MNm. Setting a desired value as MNm with motor rotary acceleration ΔNm is nothing but an alternative. In this case, the decreased value may be set as MNm by decreasing the present value of MNm by αΔNm, where α is the coefficient. If clutch output acceleration DNsr is used for correction, the result given by correcting DNm with DNsr corresponds to the result given by correcting MNm with DNsr. Thus, rather than correcting directly MNm with DNsr, correcting DNm with DNsr would be encouraged.

In the next box S530, the 4WD controller outputs clutch engagement command for the clutch control component 8A to engage the clutch 12.

According to this exemplary implementation of the present invention, during engagement of the clutch prior to shift into 4WD, the electric motor 4 is driving the input shaft of the clutch 12 with a very small amount of torque. Upon engagement of the clutch 12, the clutch input shaft rotates at motor speed Nm exceeding the clutch output speed Nsr by difference Nmofs. As the electric motor 4 is producing the very small amount of torque, PPE (powertrain play elimination) starts immediately after engagement of the clutch 12 without any delay. As it starts at the moment immediately after engagement of the clutch 12, the PPE ends at very early timing. At this very early timing, the subsequent shift into 4WD starts. Besides, the electric motor 4 has produced torque and eliminated powertrain play, ensuring vehicle acceleration beyond satisfaction in accordance with any desired torque control of the electric motor 4.

For comparison purpose, this section provides description on less preferred technique of engagement of clutch prior to the subsequent motor torque for vehicle acceleration. According to the known technique, during engagement of the clutch prior to shift into 4WD, the electric motor 4 is producing no torque. Upon engagement of the clutch, the clutch input shaft rotates at motor speed Nm, which is generally equal to clutch output speed Nsr of the clutch 12 (Nmofs≈0). Immediately after engagement of the clutch 12, the motor torque is zero. From the zero level, the electric motor 4 produces torque gradually to suppress shock during shift into 4WD, making it difficult to provide quick stress-free acceleration.

There is a delay from a clutch engagement command to the actual engagement of the clutch 12. According to the implementation of the invention, to cope with this delay, the clutch output acceleration DNsr is taken into account. The acceleration DNsr is used to correct a desired value of motor speed MNm to bring a revolution speed difference between an actual value of motor speed Nm and an actual value of the clutch output speed Nsr at the time of engagement of the clutch 12 into a predetermined range. This technique is effective to suppress torque variation upon engagement of the clutch 12 within a desired range regardless of degrees of vehicle acceleration.

According to the implementation of the present invention, motor acceleration ΔNm of the motor 4 is also taken into account. If the acceleration ΔNm is great, the actual value of motor speed Nm at the time of engagement of the clutch 12 becomes considerably greater than the past value at the time of determination. To alleviate ill effect due to different degrees of rotary acceleration ΔNm, the motor acceleration ΔNm is used as a correction factor to suppress torque variation upon engagement of the clutch 12.

The above-described clutch control is particularly effective when shift into 4WD follows immediately after PPE. Thus, it may be carried out only when an accelerator switch is turned on apparently demanding 4WD. The use of this clutch control may be limited to vehicle operation at high vehicle speeds by executing boxes S2010 to S2040 (clutch engagement timing control) only when the vehicle speed exceeds a preset value.

With regard to the motor control, the torque variation upon engagement of the clutch 12 may be suppressed by keeping power applied to the electric motor 4 constant. Motor torque drops as motor speed increases, making it easier to soften clutch engagement at high speeds. The motor control of this kind may be terminated upon or immediately after engagement of the clutch 12.

Figure 41:
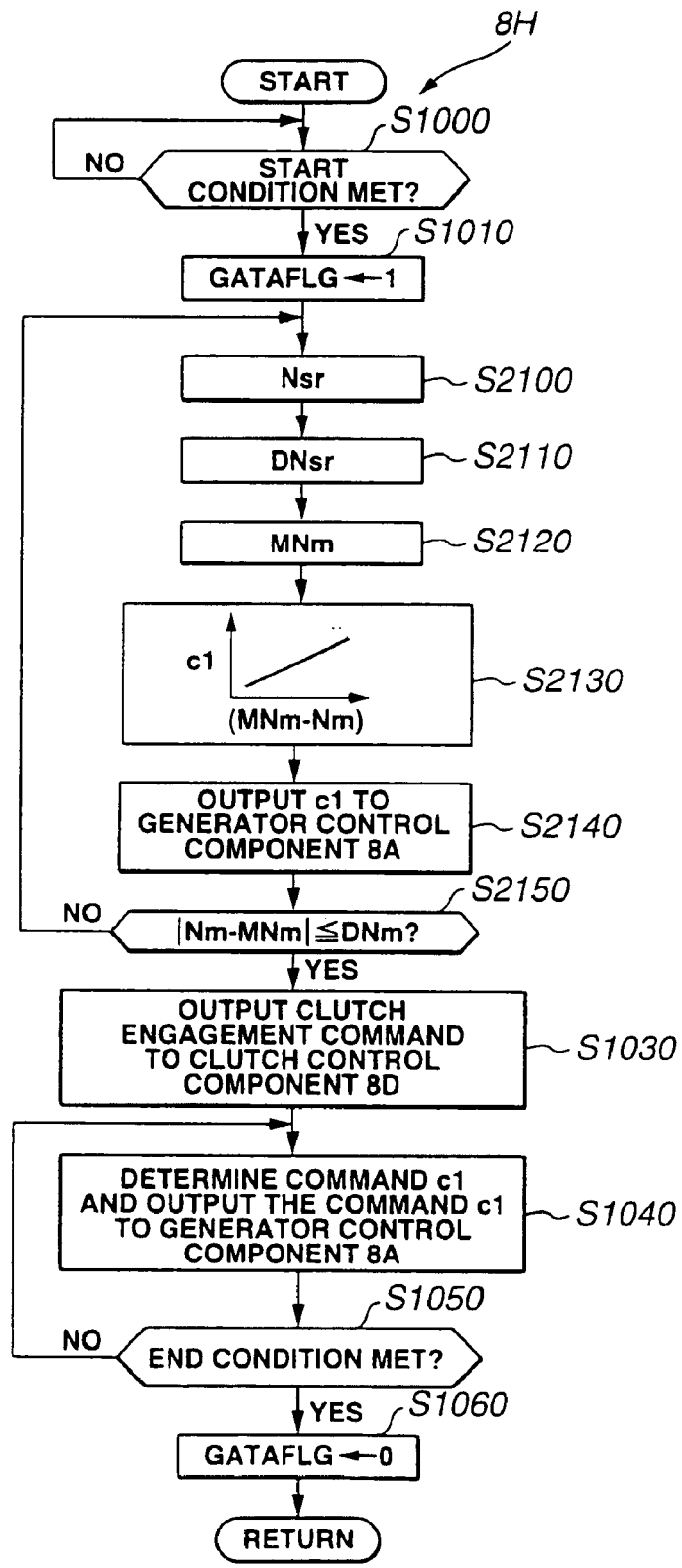
FIG. 41 is a flow diagram, similar to FIG. 13, of another control routine for play adjustor component (8H*) for eliminating powertrain play according to the present invention.

With reference to FIG. 41, another exemplary implementation according to the present invention will be described. This exemplary implementation is substantially the same as the previously described implementation of the present invention, which was described with reference to the flow diagram in FIG. 13. However, this implementation is different from the previously described implementation in play adjustor component 8H.

With reference to the flow diagram in FIG. 13, it is remembered that immediately after the flag GATAFLG has been set (see box S1010), the clutch engagement is commanded in box S1030, and immediately after the flag GATAFLG has been cleared (see box S1060), the generator 7 is instructed to cease power generation in box S1080 if shift into 4WD is not imminent (see box S1070). The flow diagram in FIG. 41 is substantially the same as that in FIG. 13 except the provision of new boxes S2100 to S2150 between the boxes S1010 and S1030. These new boxes are provided to determining timing at which the clutch engagement is commanded. Other difference resides in the manner of controlling the generator 7 after the box S1060. As different from the flow diagram in FIG. 13, the generator 7 is ordered to continue generation of a very small amount of power after the flag GATAFLG has been cleared in the box S1060.

In FIG. 41, at box S2100, the 4WD controller determines clutch output speed Nsr of the clutch 12.

In the next box S2110, the 4WD controller determines clutch output acceleration DNsr of the clutch 12.

In the next box S2120, the 4WD controller computes a desired value of motor speed MNm, which is expressed by the equation (16).

In the next box S2130, the 4WD controller determines a generator command c1 based on the absolute value of a difference |MNm−Nm| by, for example, looking into the illustrated look-up table within the box S2130, The 4WD controller determines the generator command c1 to keep electric power applied to the electric motor 4 at a constant determined by the generator command c1.

In the next box S2140, the 4WD controller outputs the generator command c1 to the generator control component 8A (see FIG. 3). Then, the control logic goes to box S2150.

The above-mentioned description on box S2130 concerns the use of the difference |MNm−Nm| as a variable in determining the generator command c1. The manner of determining generator command c1 is not limited to this example. If desired, a difference |Nm−Nsr| may be used Instead of the difference |MNm−Nm|.

Assuming the vehicle is moving at high vehicle speeds, the absolute value of the difference |MNm−Nm| is great. As the generator command c1 is proportional to the difference |MNm−Nm|, the electric power applied to the electric motor 4 is initially great, causing the motor speed Nm to increase toward the desired value of motor speed MNm very quickly. As it approaches the desired value of motor speed MNm, the difference |MNm−Nm| becomes small, so that the electric power reduces. Besides, as motor speed increases, motor torque reduces. The reductions in electric power and in motor torque can suppress shock upon engagement of the clutch 12.

In the next box S2150, the 4WD controller determines whether or not the absolute value of difference between Nm and MNm is less than an allowable deviation DNm, which may be expressed by the equation (17).

If this is not the case, the control logic returns to box S2100. This loop of boxes S2100 to S2150 is repeated until the interrogation in box S2150 turns out to be affirmative.

If the interrogation in box S2150 is affirmative, the control logic goes to box S1030.

In box S1030, the 4WD controller output clutch engagement command in the same manner as the flow diagram in FIG. 13. In response to the clutch engagement command, the clutch control component 8D allows supply of current to engage the clutch 12.

Upon or immediately after this engagement of the clutch 12, the 4WD controller starts PPE in the same manner as the flow diagram in FIG. 13.

The time charts in FIGS. 42A to 42D illustrate operation of the clutch control according to this implementation of the present invention. In these FIGS. 42A to 42D, the allowable deviation DNm of the formula (17) is not shown for brevity of illustration.

At the moment $t_S$, an accelerator switch is turned on. The 4WD controller determines that a shift to 4WD will take place is when the accelerator switch is turned on. The 4WD controller may determine that a shift to 4WD will take place when the wheel speed of the front road wheels 1L and 1R exceed a predetermined value after the accelerator switch has been turned on. Immediately after the determination, the 4WD controller keeps the electric power applied to the electric motor 4 at a constant value that is proportional to the absolute value of difference between the motor speed Nm and the desired value of motor speed MNm. As a result, even when the vehicle speed is high, the motor sped Nm can reach the desired value of motor speed MNm quickly within a very short period of time to satisfy the relationship expressed by the formula (17). The 4WD controller outputs a clutch engagement command. Motor torque upon engagement of the clutch 12 reduces because the motor speed has increased and the power applied to the electric motor is kept constant. Besides, engagement of the clutch is carried out after the absolute value of difference between the motor speed Nm and the desired value of motor speed MNm has become less than the allowable deviation DNm, see the formula (17). Thus, torque variation upon engagement of the clutch 12 becomes small so that shock is negligibly small.

Upon engagement of the clutch 12, the clutch input shaft rotates at motor speed Nm slightly exceeding the clutch output speed Nsr. As the electric motor 4 is producing a very small amount of torque, PPE (powertrain play elimination) starts immediately after engagement of the clutch 12 without any delay. As it starts at the moment immediately after engagement of the clutch 12, the PPE ends at very early timing. In the case where the 4WD controller keeps electric power applied to the electric motor 4 constant after the moment when the motor speed Nm and the desired value of motor speed MNm have matched with each other, the electric motor 4 produces motor torque to keep the motor speed Nm into agreement with the desired value of motor speed MNm. When a shift into 4WD occurs subsequently, immediately after or before completion of the PPE, the electric motor 4 is producing torque, allowing smooth shift to motor torque control for driving the rear road wheels 3L, 3R for 4WD. Upon immediately after completion of PPE, the electric motor 4 may keep on producing the small amount of torque to provide standby state for the subsequent shift into 4WD or may cease producing the small amount of torque if the subsequent shift into 4WD is not imminent.

As discussed before, there is a delay from a clutch engagement command to the actual engagement of the clutch 12.

With reference to FIGS. 43A to 43C, this delay dose not pose any problem when the clutch output speed Nsr remains constant after the accelerator switch is turned on. Because there is no variation in the desired value of motor speed MNm over this delay, the motor speed Nm and the desired value of motor speed MNm can maintain the preset difference upon the actual engagement of the clutch after the delay.

With reference to FIGS. 44A to 44D, the delay is indicated by GDV. This is the case where the clutch output revolution DNsr exists when the accelerator switch is turned on and the desired value of motor speed (Nsr+Nmofs) increases over the delay GDV by the correction factor (DNsr× GDV). In this case, the difference between the motor speed Nm and the clutch output speed Nsr upon the actual engagement tends to become greater than the predetermined revolution speed difference Nmofs. If, under this condition, the clutch were actually engaged, the motor torque immediately after the engagement of the clutch would be subject to considerable variation. Thus, it is necessary to use the desired value of motor speed MNm as expressed by the equation (16) that includes the correction factor (DNsr× GDV). Clutch command should be applied when the condition as expressed by the formula (17) is met.

With reference to FIGS. 45A to 45C, let us now consider the case where the motor acceleration ΔNm is great In this case, the motor speed Nm overshoots the desired value of motor speed MNm.

With reference to FIGS. 46A to 46C, a motor acceleration correction factor ΔNmOFF is used to cause generation of a clutch engagement command when the motor speed Nm matches with (Nsr+Nmofs+DNsr−DNm−ΔNmOFF) so that the motor speed Nm falls within a predetermined window about MNm upon the actual engagement of the clutch after the delay GDV. FIG. 47 illustrates the characteristic of the motor acceleration correction factor ΔNmOFF versus motor acceleration ΔNm. From the graph in FIG. 47, it is understood that the motor acceleration correction factor ΔNmOFF remains zero when the motor acceleration ΔNm is not greater than a predetermined value, but it is proportional to the motor acceleration ΔNm when the latter is greater than the predetermined value.

In each of the implementations according to the present invention, the generator 7 is used as a source of electric power applied to the electric motor 4. The present invention is operable with other type of a source of electric power. For example, a battery may be used as a source of electric power applied to the electric motor 4.

In each of the implementations according to the present invention, the present invention is applied to a motor vehicle having a set of two front road wheels and a set of two rear road wheels. The present invention is operable with a motor vehicle having a front road wheel and a rear road wheel.

While the present invention has been particularly described, in conjunction with exemplary implementations. It is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2002-063733, filed Mar. 8, 2002, No. 2002-105621, filed Apr. 8, 2002, No. 2002-205997, filed Jul. 15, 2002, and No. 2002-259180, filed Sep. 4, 2002, disclosure of each of which is hereby incorporated by reference in its entirety.

What is claimed is:

1. A vehicle powertrain control system, comprising:
a powertrain including an electric motor and a clutch between the electric motor and a motor driven road wheel; and
a powertrain play adjustor component for eliminating powertrain play between the electric motor and the road wheel upon determination that powertrain play elimination (PPE) is needed for transmitting motor torgue to the motor driven road wheel, the powertrain play adjustor component controlling engagement of the clutch and regulating the electric motor to produce a very small amount of motor torque required for PPE.

2. The vehicle powertrain control system as claimed in claim 1, further comprising:
a powertrain including a main source of driving torque for driving a main road wheel; and
a controller including the powertrain play adjustor component, the controller establishing the transmission of motor torque to the motor driven road wheel in an all-wheel drive mode.

3. The vehicle powertrain control system as claimed in claim 2, further comprising:
an internal combustion engine as the main source of driving torque, and a generator, as a source of electric power to the electric motor, drivingly connected to the internal combustion engine, and
wherein the powertrain play adjustor component determines generator command for the generator in response to the engine speed to cause the generator to keep electric power to the electric motor constant.

4. The vehicle powertrain control system as claimed in claim 3, wherein the generator command includes a correction factor that varies in response to an acceleration demand by an accelerator.

5. The vehicle powertrain control system claimed in claim 2, further comprising:
an internal combustion engine as the main source of driving torque, and a generator, as a source of electric power to the electric motor, drivingly connected to the internal combustion engine, and
wherein the powertrain play adjustor component modifies generator command for the generator by a value that increases as an acceleration demand by an accelerator increases.

6. The vehicle powertrain control system as claimed in claim 2, wherein the powertrain play adjustor component monitors a shift detector to determine whether or not there is torque transmission from the main source to the main road wheel and eliminates powertrain play only when there is torque transmission from the main source to the main road wheel.

7. The vehicle powertrain control system as claimed in claim 2, further comprising:
an internal combustion engine as the main source of driving torque, a generator, as a source of electric power to the electric motor, drivingly connected to the internal combustion engine, and an engine controller receiving load torque applied to the internal combustion engine for electric power generation, the engine controller regulating an torque control element to cause the internal combustion engine to increase output torque by an amount opposed to the load torque.

8. The vehicle powertrain control system as claimed claim 1, wherein the powertrain play adjustor component keeps electric power applied to electric motor constant for regulating the electric motor to produce the very small amount of motor torque for PPE.

9. The vehicle powertrain control system as claimed claim 1, wherein the powertrain play adjustor component allows inertia to keep rotating the electric motor to eliminate powertrain play by stopping supply of electric power to the electric motor before completion of PPE.

10. The vehicle powertrain control system as claimed in claim 1, wherein the powertrain play adjustor component stops producing the very small amount of motor torque required for PPE when the number of motor revolutions from the start of PPE is equal to or greater than a preset number of revolutions.

11. The vehicle powertrain control system as claimed in claim 10, wherein the powertrain play adjustor component counts up a counter upon end-condition for PPE being met, and determines the preset number of revolutions as a function of the counter.

12. The vehicle powertrain control system as claimed in claim 1, wherein the powertrain play adjustor component stops producing the very small amount of motor torque required for PPE when a deviation between a converted revolution speed from motor speed of the electric motor and a wheel speed of the motor driven road wheel is in the proximity of zero.

13. The vehicle powertrain control system as claimed in claim 1, wherein the powertrain play adjustor component stops producing the very small amount of motor torque required for PPE upon expiration of a preset period of time after the powertrain play adjustor component started producing the very small amount of motor torque for PPE.

14. The vehicle powertrain control system as claimed in claim 13, wherein the powertrain play adjustor component counts up a counter upon end-condition for PPE being met, and determines the preset period of time as a function of the counter.

15. The vehicle powertrain control system as claimed in claim 1, wherein the powertrain play adjustor component keeps on producing the very small amount of motor torque required for PPE until an acceleration demand from an accelerator becomes greater than a predetermined value.

16. The vehicle powertrain control system as claimed in claim 1, wherein the powertrain play adjustor component produces the very small amount of motor torque again for another round of PPE when an acceleration demand from an accelerator becomes greater than a predetermined value.

17. The vehicle powertrain control system as claimed in claim 1, wherein the powertrain play adjustor component produces the very small amount of motor torque again for another round of PPE when an acceleration demand from an accelerator becomes greater than a predetermined value under a condition when the motor vehicle is in motion with the acceleration demand being zero.

18. The vehicle powertrain control system as claimed in claim 1, wherein the powertrain play adjustor component starts PPE by starting producing the very small amount of motor torque with the clutch engaged when a brake demand has decreased, and ends PPE by stopping producing the very small amount of motor torque when an acceleration demand becomes greater than a predetermined value.

19. The vehicle powertrain control system as claimed in claim 1, wherein the powertrain play adjustor component increases the magnitude of the very small amount of motor torque required for PPE with decreasing rate of a brake demand.

20. The vehicle control system as claimed in claim 1, wherein the powertrain play adjustor component generates clutch engagement command when a clutch input speed of the clutch matches with a desired value of speed that is higher than a clutch output speed of the clutch by a predetermined difference.

21. The vehicle powertrain control system as claimed in claim 20, wherein the powertrain play adjustor component regulates the electric motor in response to the desired value of speed before engagement of the clutch.

22. The vehicle powertrain control system as claimed in claim 20, wherein, before engagement of the clutch, the powertrain play adjustor component keeps electric power applied to the electric motor at a value that is determined by a deviation between motor speed of the electric motor and the desired value of speed.

23. The vehicle powertrain control system as claimed in claim 20, wherein the desired value of speed is corrected based on a clutch output acceleration of the clutch.

24. The vehicle powertrain control system as claimed in claim 20, wherein the desired value of speed is corrected based on a clutch input acceleration of the clutch.

25. The vehicle powertrain control system as claimed in claim 1, wherein the powertrain play adjustor component produces motor creep torque for a predetermined period of time or till a shift into all-wheel drive mode when the vehicle is about to creep or creeping upon completion of PPE.

26. A vehicle powertrain control method, the vehicle powertrain including an electric motor and a clutch between the electric motor and a motor driven road wheel, the control method comprising:

eliminating powertrain play between the electric motor and the road wheel upon determination that powertrain play elimination (PPE) is needed for transmitting motor torque to the motor driven road wheel, the eliminating the powertrain play being carried out by controlling engagement of the clutch and regulating the electric motor to produce a very small amount of motor torque required for PPE.

27. A vehicle powertrain control system, comprising:

a powertrain including an electric motor and a clutch between the electric motor and a motor driven road wheel; and means for eliminating powertrain play between the electric motor and the road wheel upon determination that powertrain play elimination (PPE) is needed for transmitting motor torque to the motor driven road wheel, the powertrain play eliminating means being operative to control engagement of the clutch and to regulate the electric motor to produce a very small amount of motor torque required for PPE.

* * * * *